Aug. 31, 1926.
G. G. WILEY
1,597,853
DOUBLE CONTROL RECORDING TRACK SCALE
Filed May 10, 1924
31 Sheets-Sheet 1
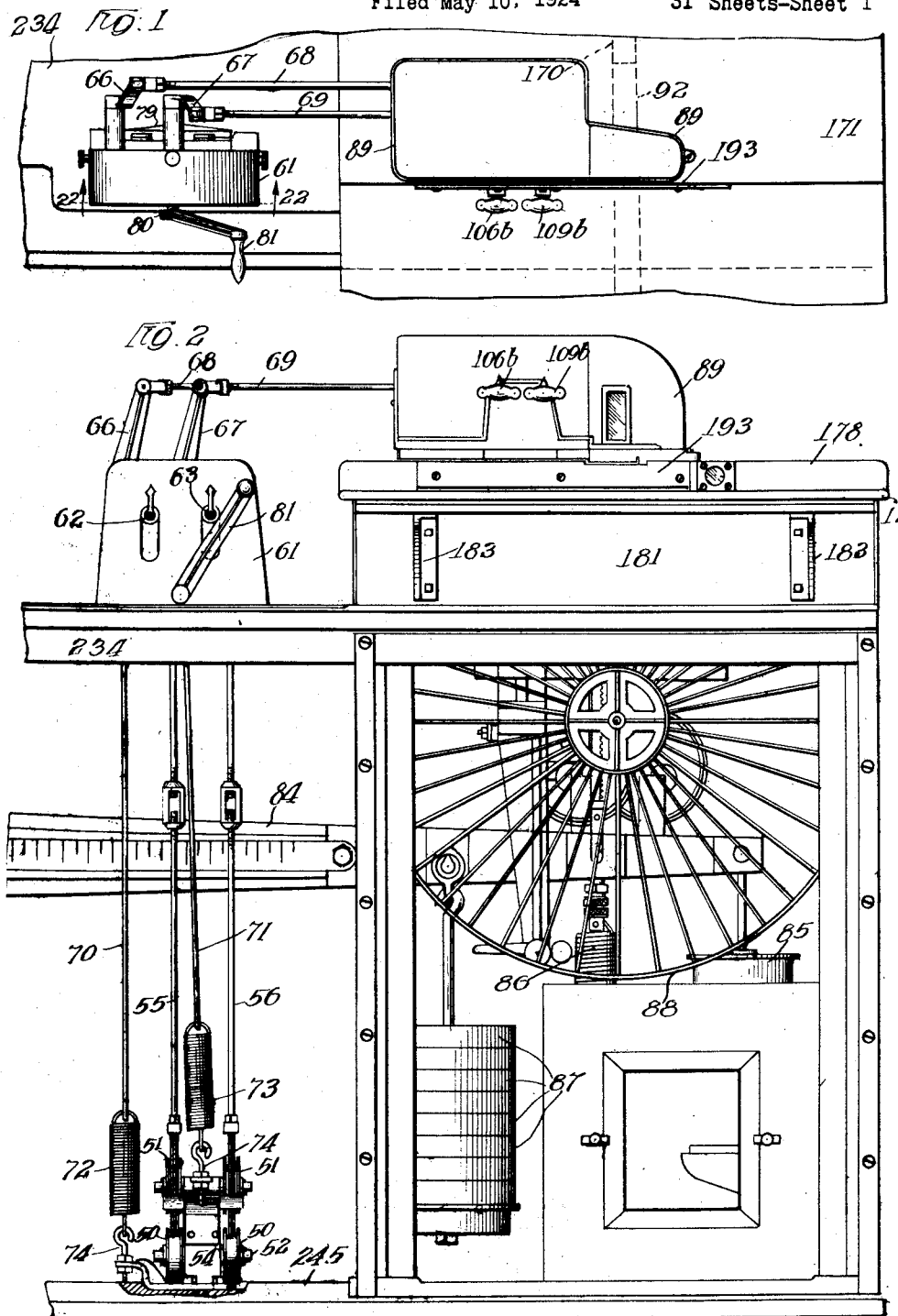

Aug. 31, 1926.
G. G. WILEY
1,597,853
DOUBLE CONTROL RECORDING TRACK SCALE
Filed May 10, 1924     31 Sheets-Sheet 2
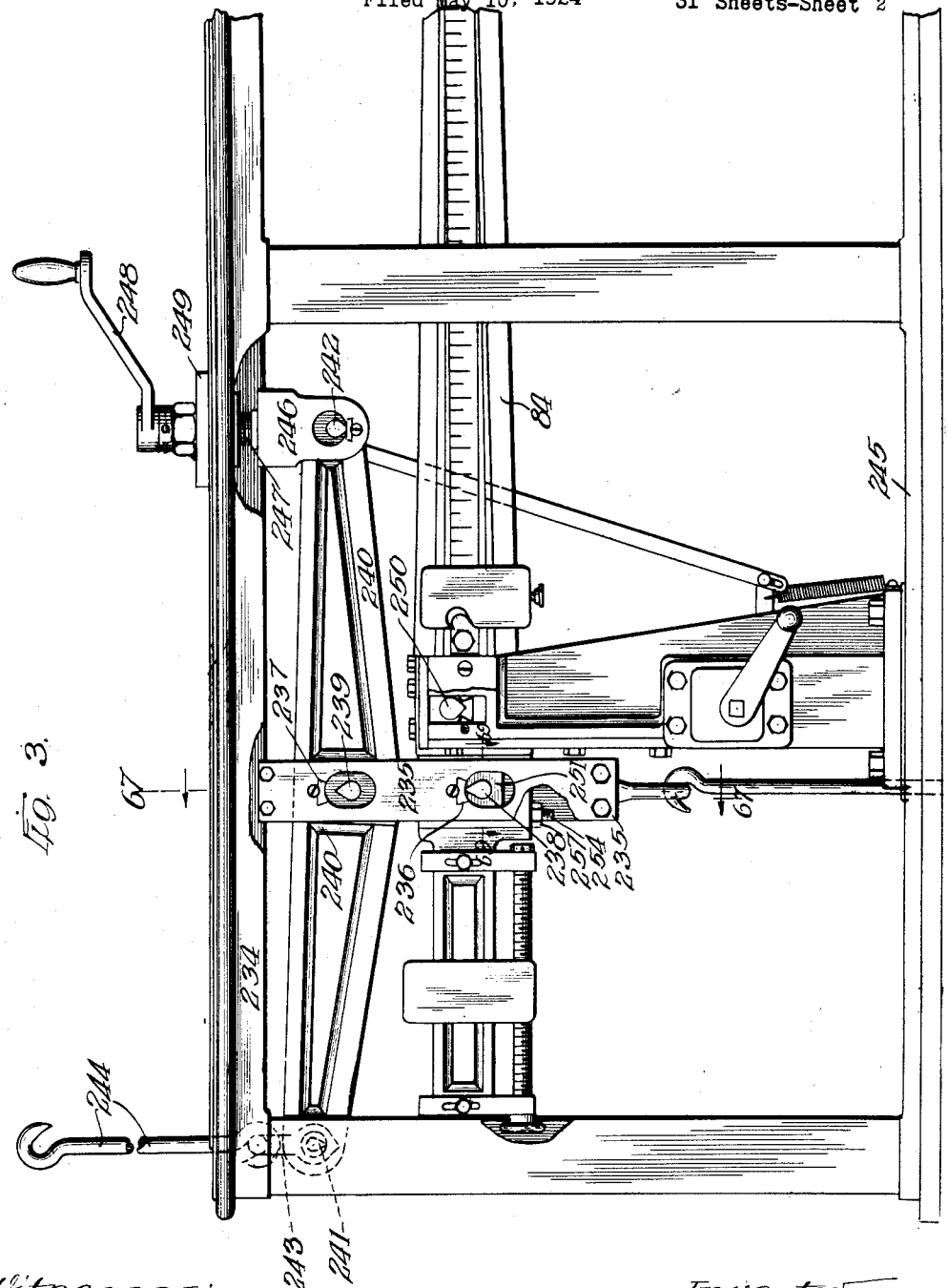
Witnesses:
Inventor:
George G. Wiley

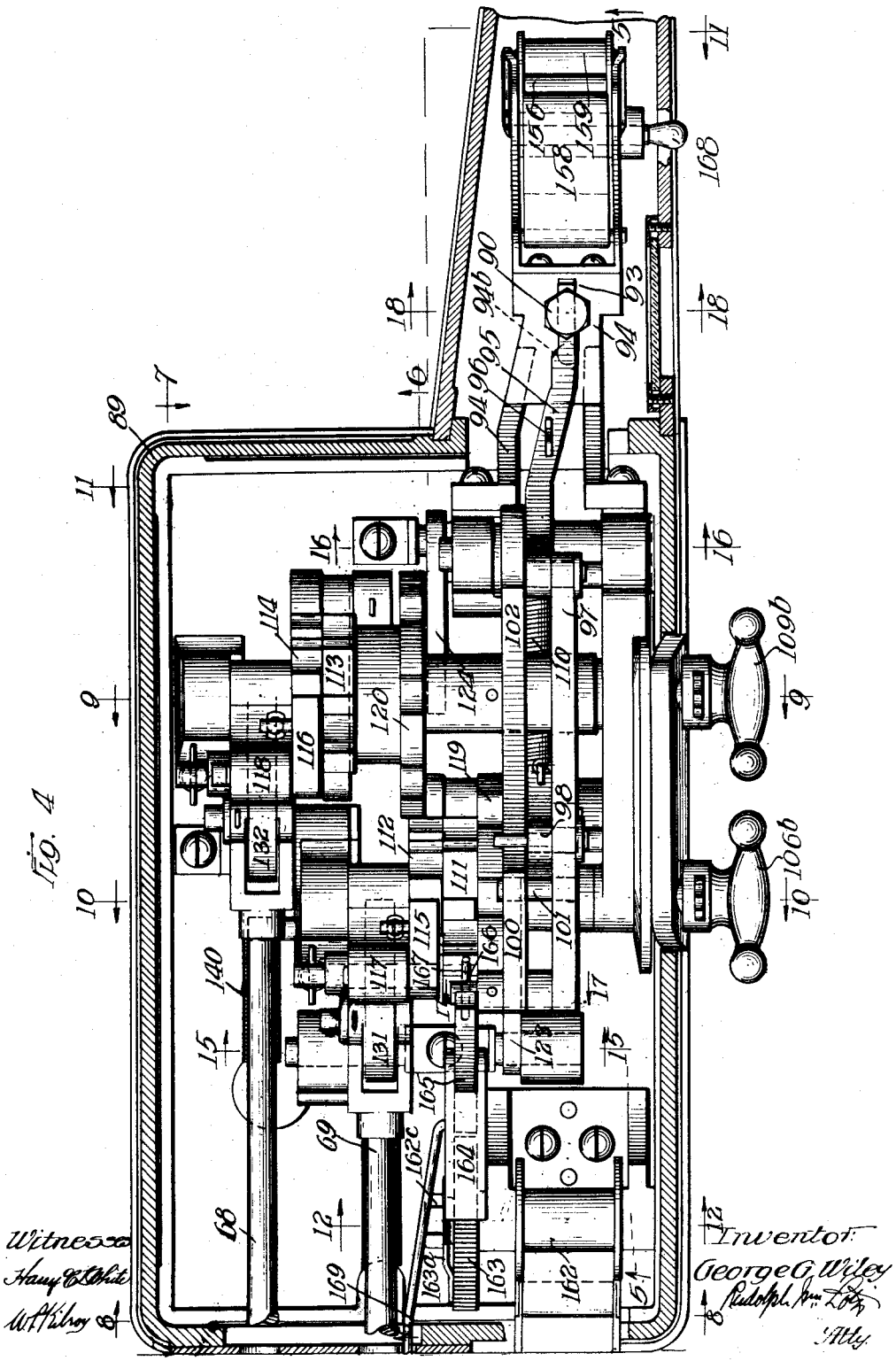

Aug. 31, 1926.　　　　　　　　　　　　　1,597,853
G. G. WILEY
DOUBLE CONTROL RECORDING TRACK SCALE
Filed May 10, 1924　　　31 Sheets-Sheet 4
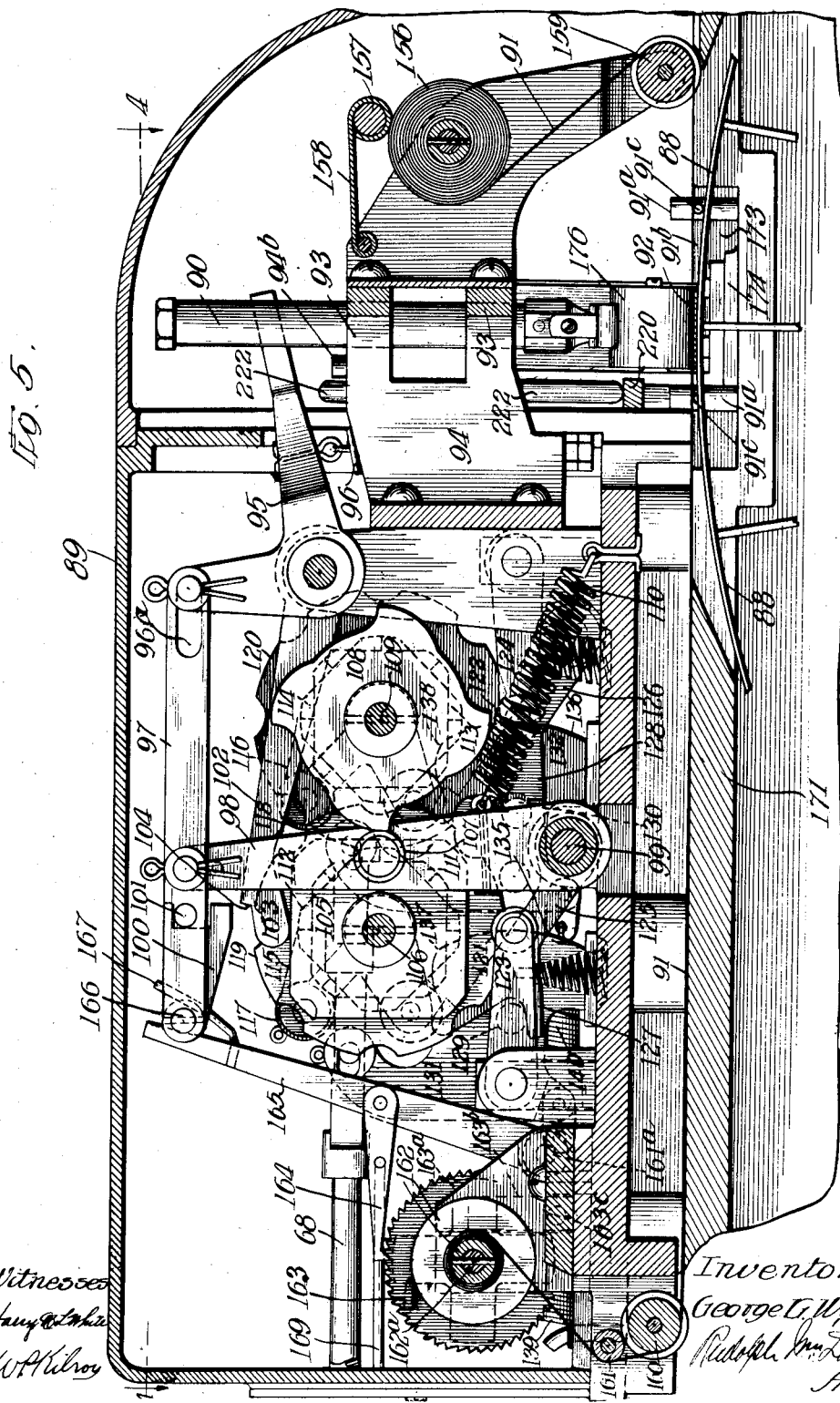

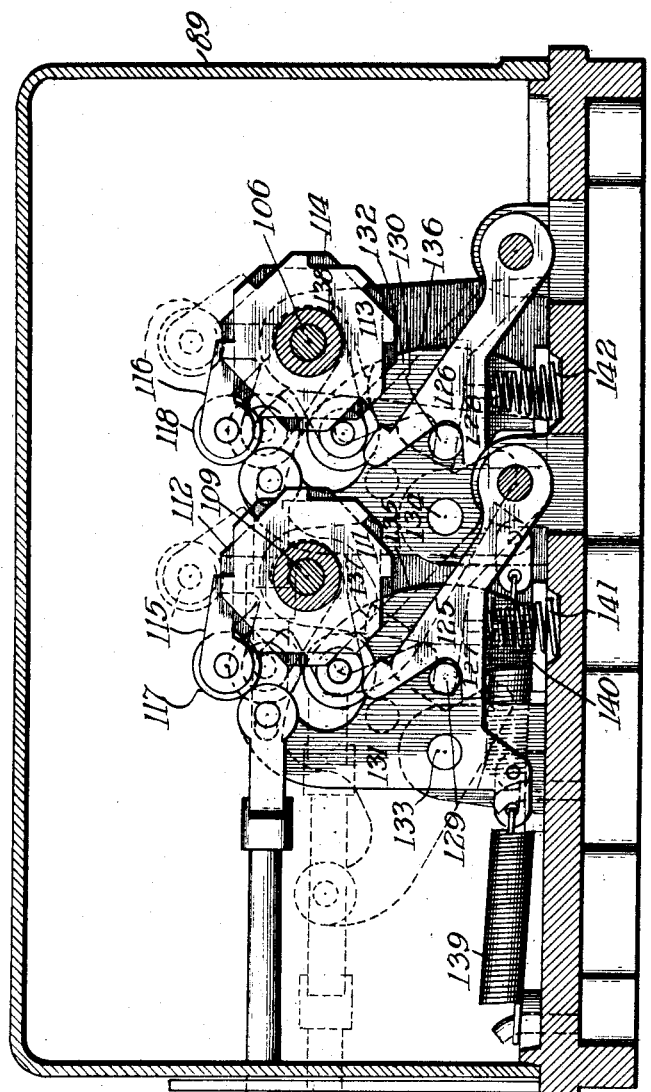

Aug. 31, 1926.
G. G. WILEY
1,597,853
DOUBLE CONTROL RECORDING TRACK SCALE
Filed May 10, 1924    31 Sheets-Sheet 6
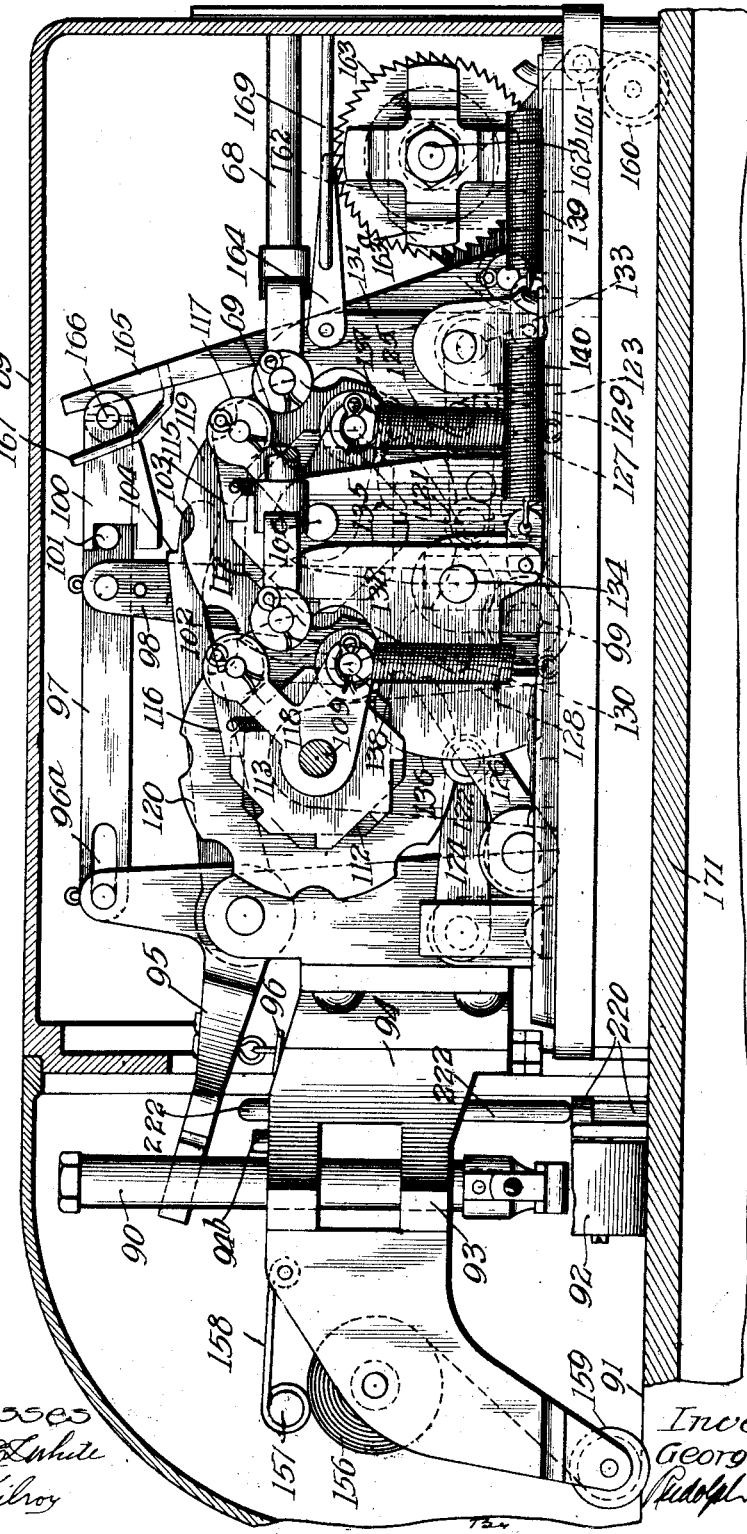

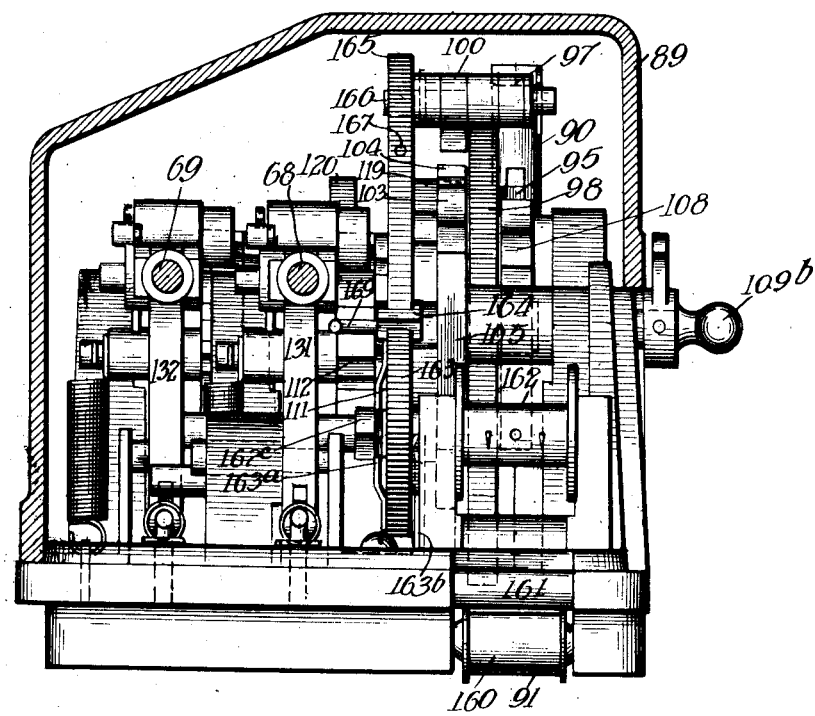

Aug. 31, 1926.
G. G. WILEY
1,597,853
DOUBLE CONTROL RECORDING TRACK SCALE
Filed May 10, 1924  31 Sheets-Sheet 8
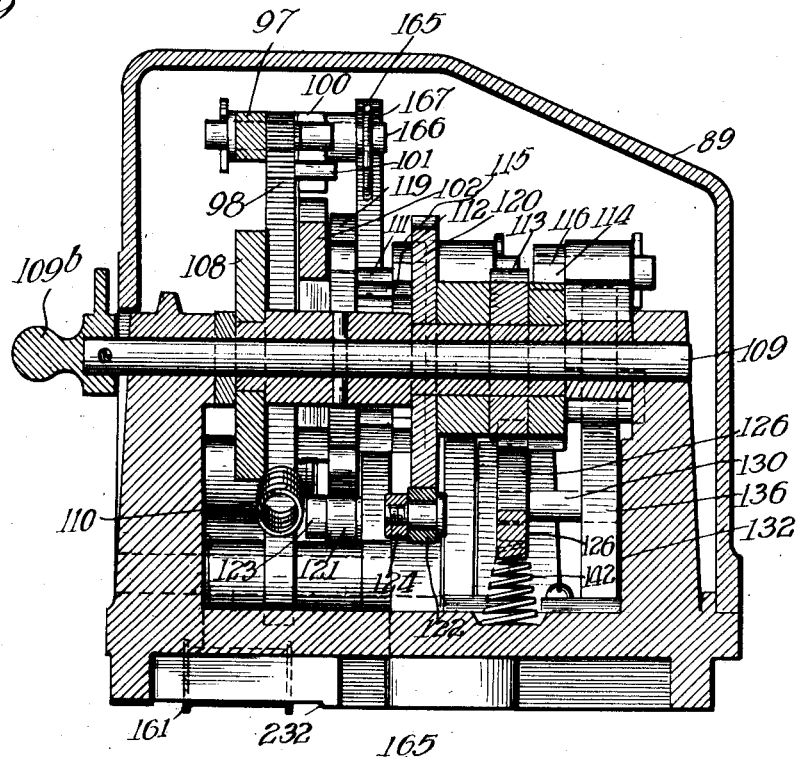
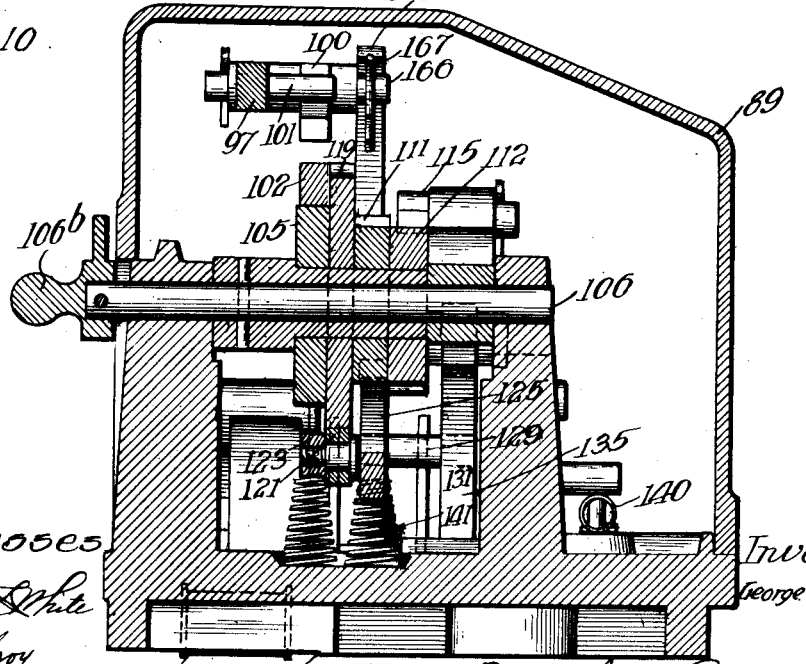

Aug. 31, 1926.   1,597,853
G. G. WILEY
DOUBLE CONTROL RECORDING TRACK SCALE
Filed May 10, 1924    31 Sheets-Sheet 9
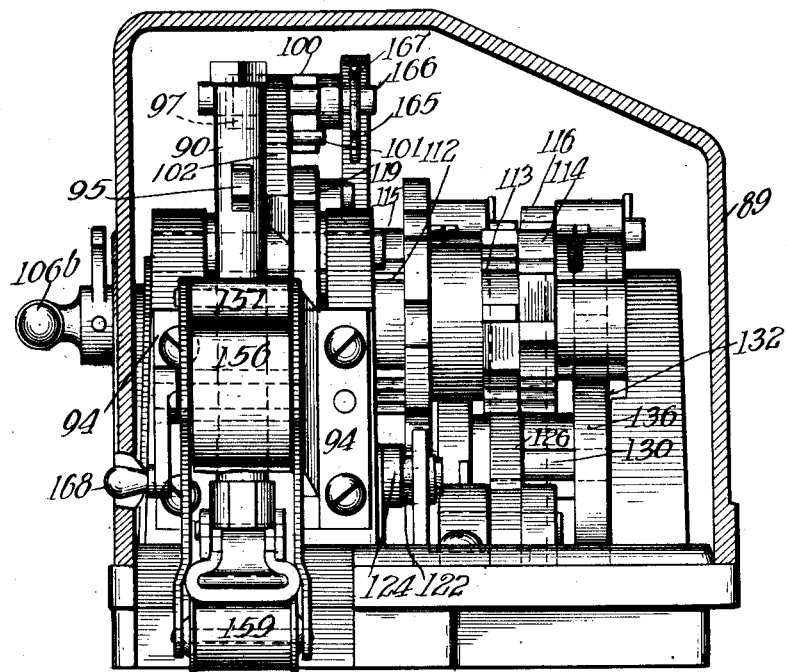
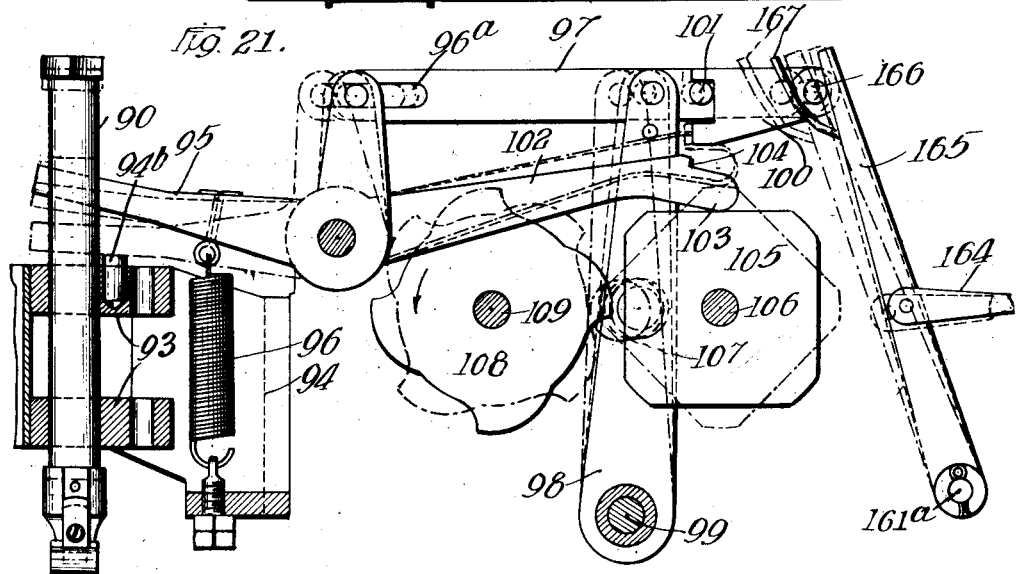

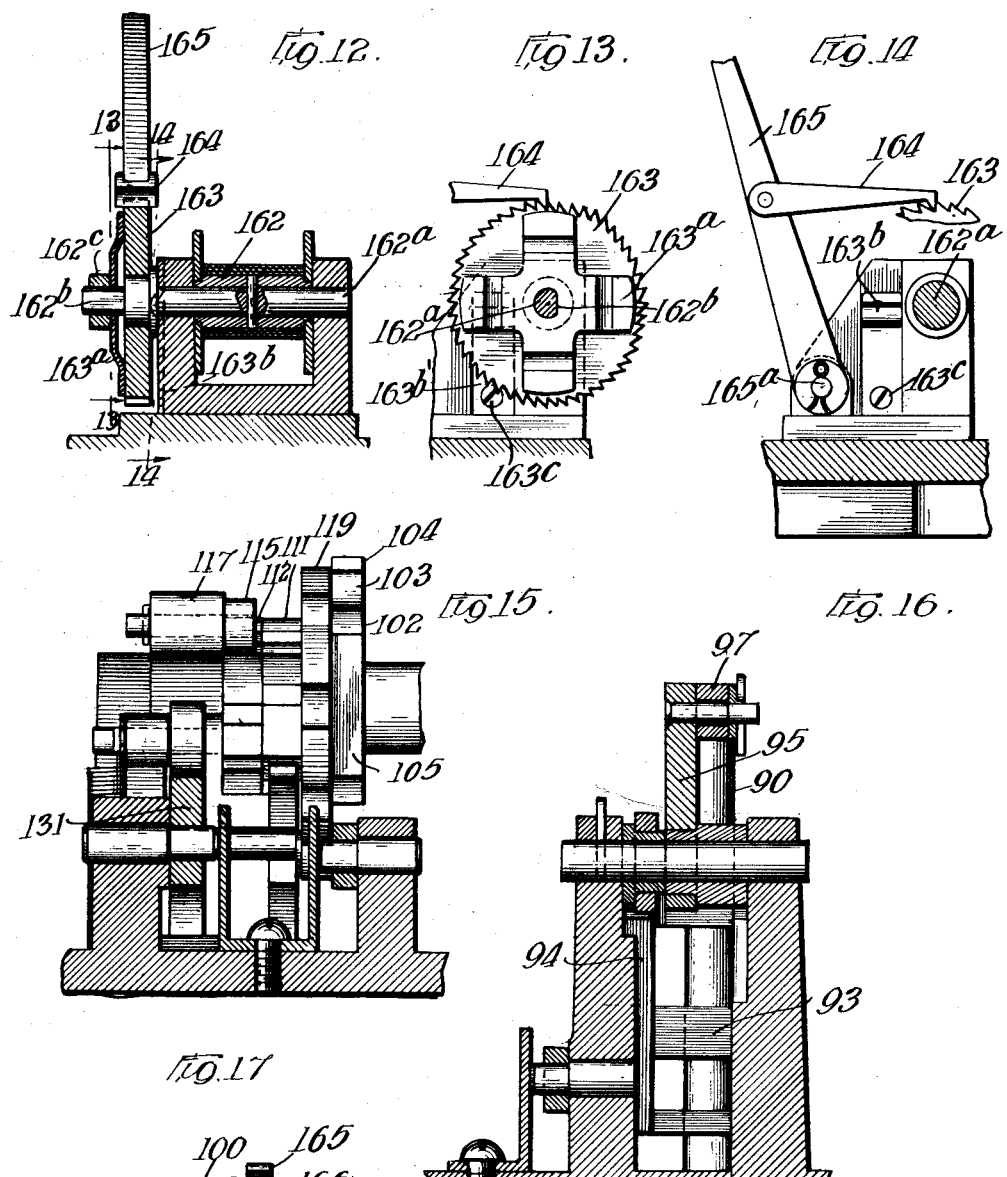

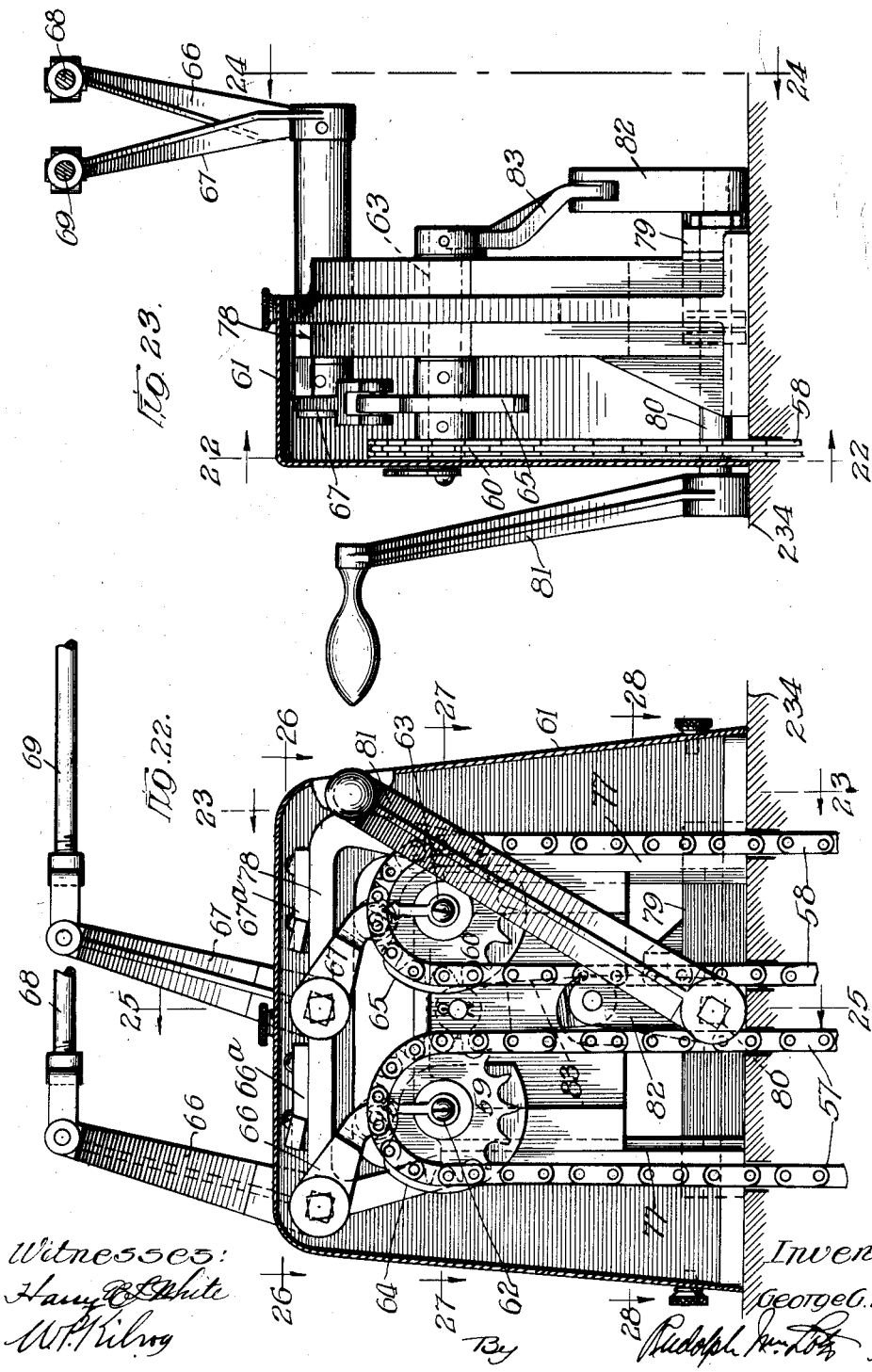

Aug. 31, 1926.
G. G. WILEY
1,597,853
DOUBLE CONTROL RECORDING TRACK SCALE
Filed May 10, 1924     31 Sheets-Sheet 12
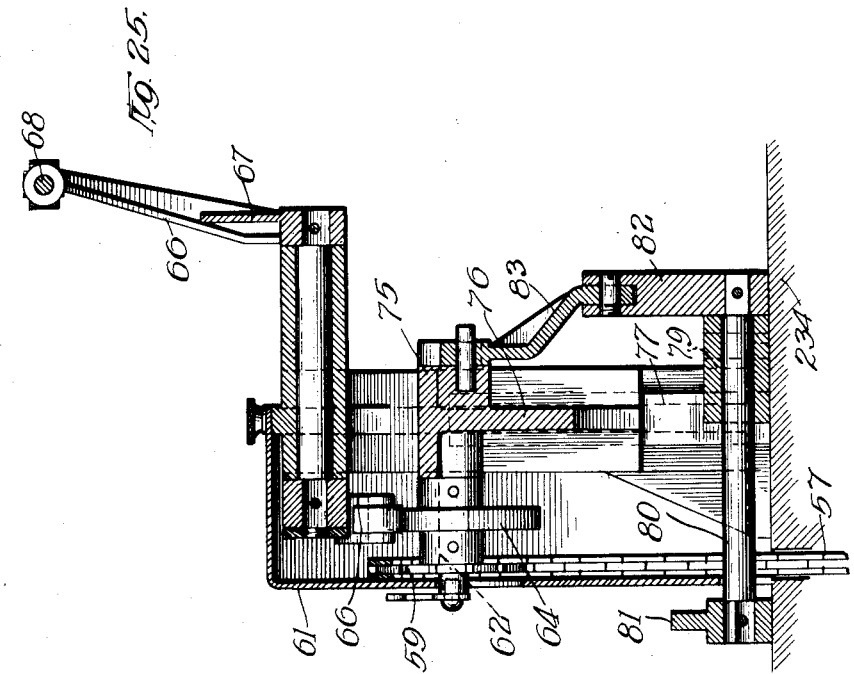
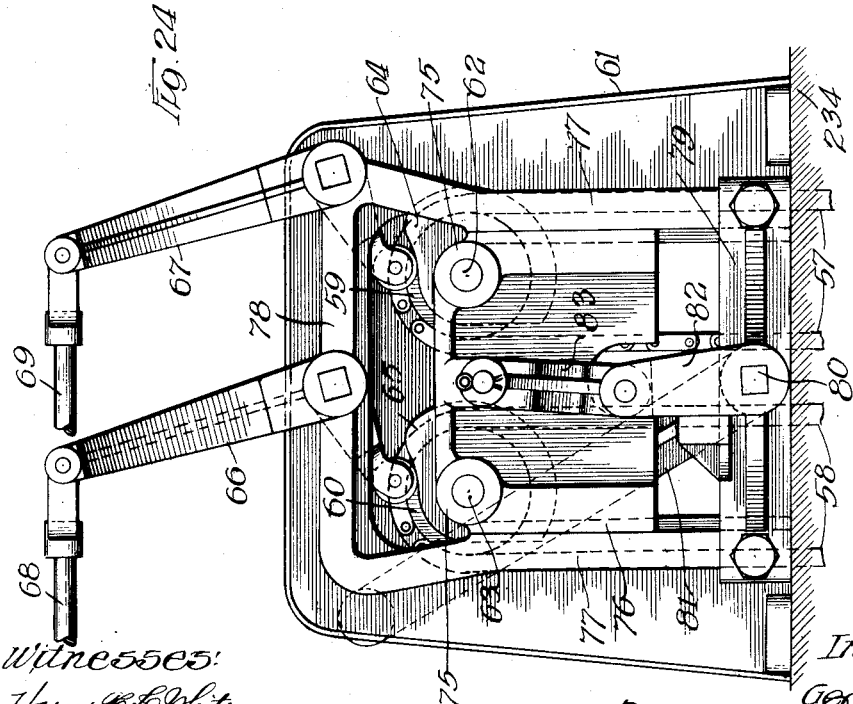

Aug. 31, 1926.
G. G. WILEY
1,597,853
DOUBLE CONTROL RECORDING TRACK SCALE
Filed May 10, 1924    31 Sheets-Sheet 13
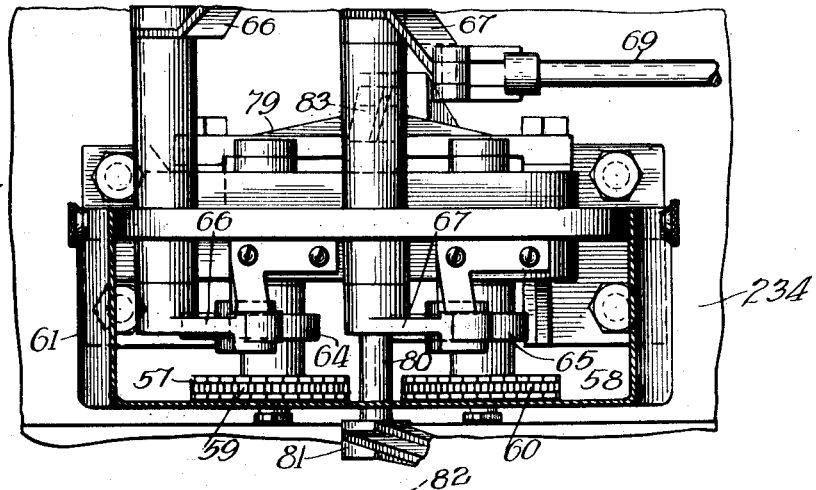
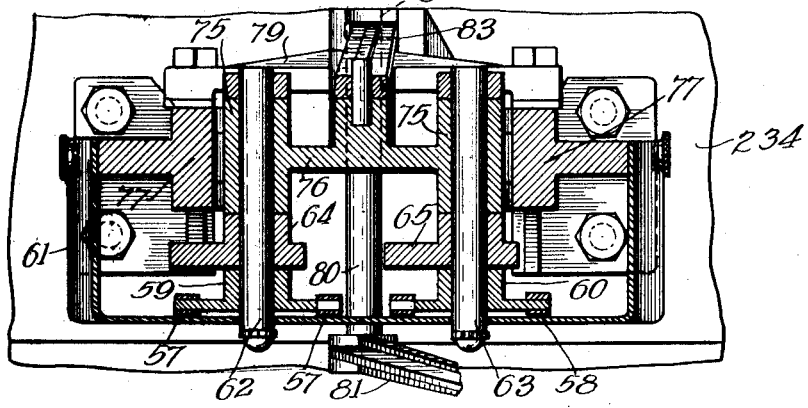
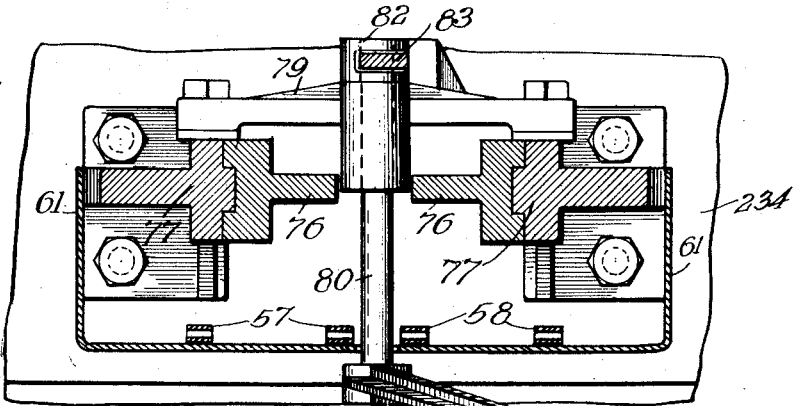

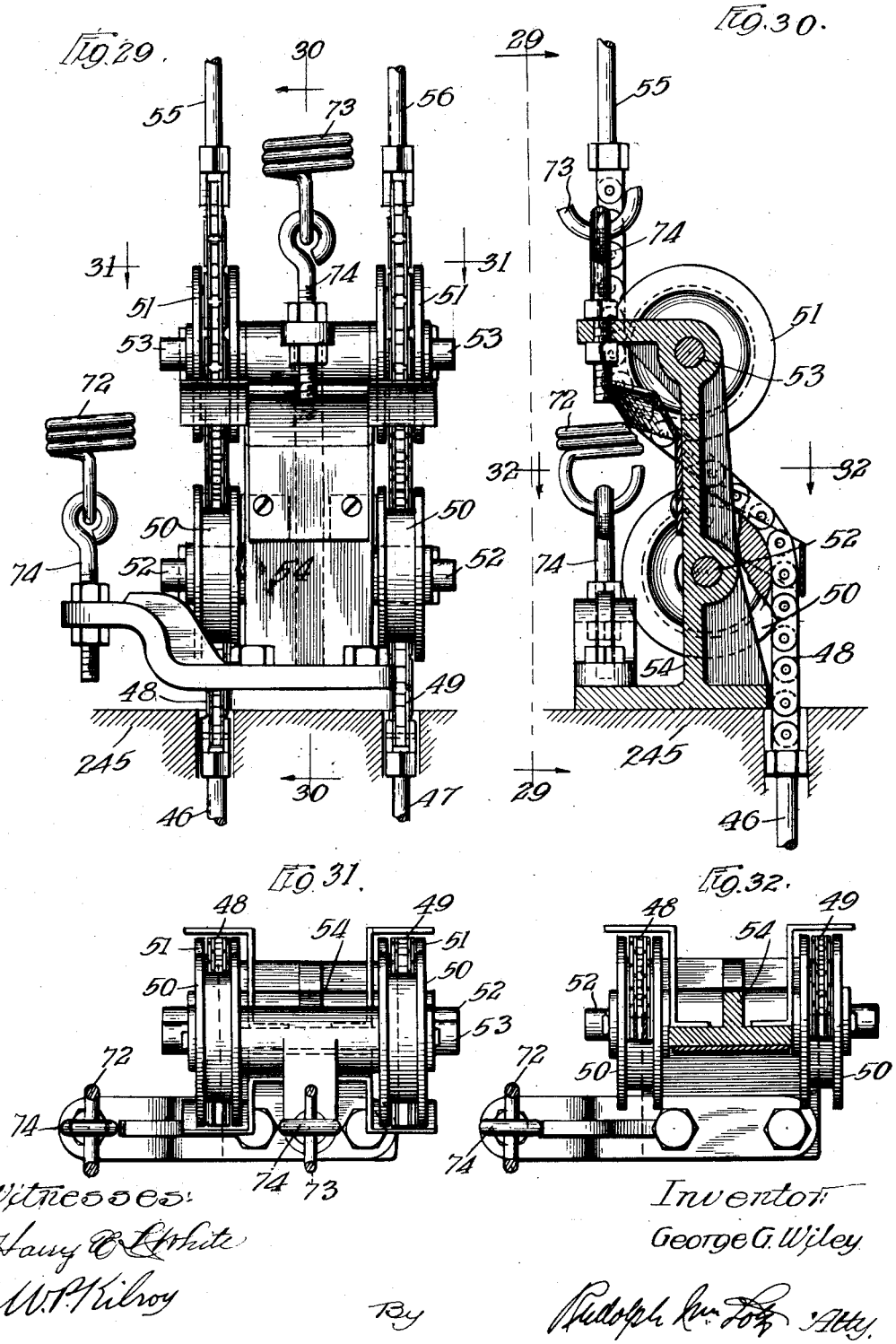

Aug. 31, 1926.
G. G. WILEY
1,597,853
DOUBLE CONTROL RECORDING TRACK SCALE
Filed May 10, 1924   31 Sheets-Sheet 15
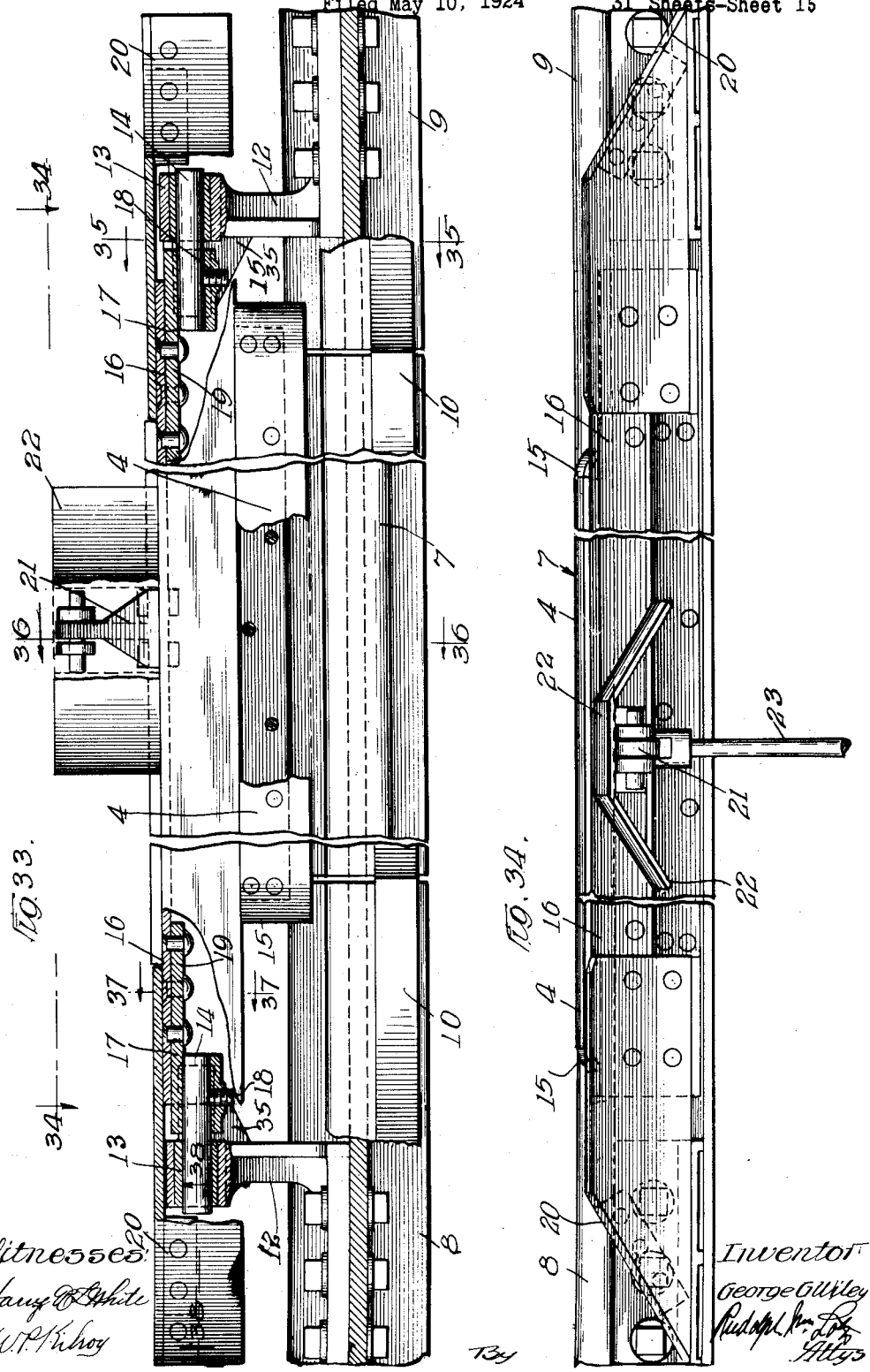

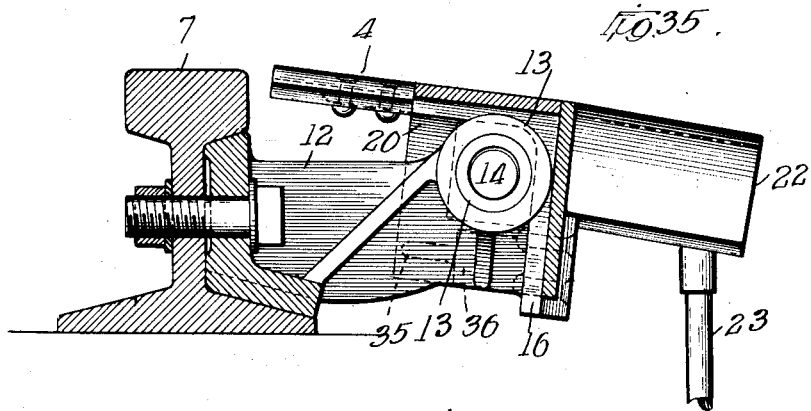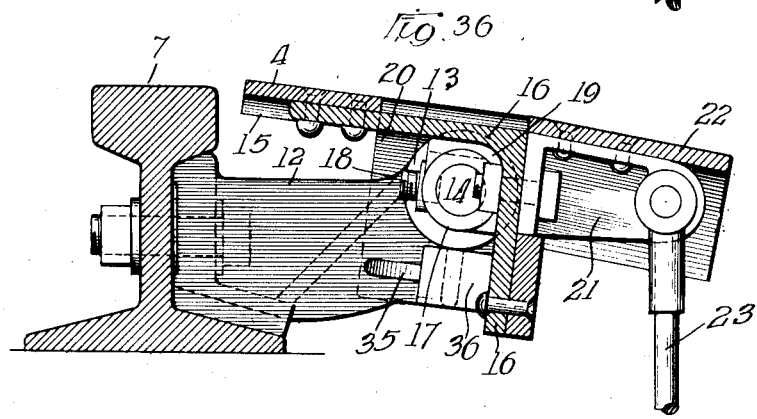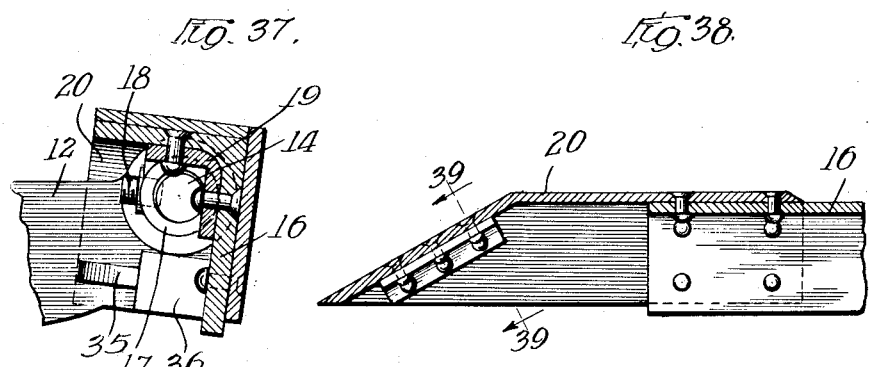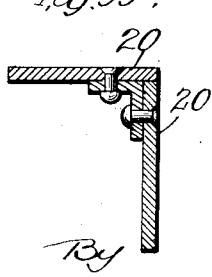

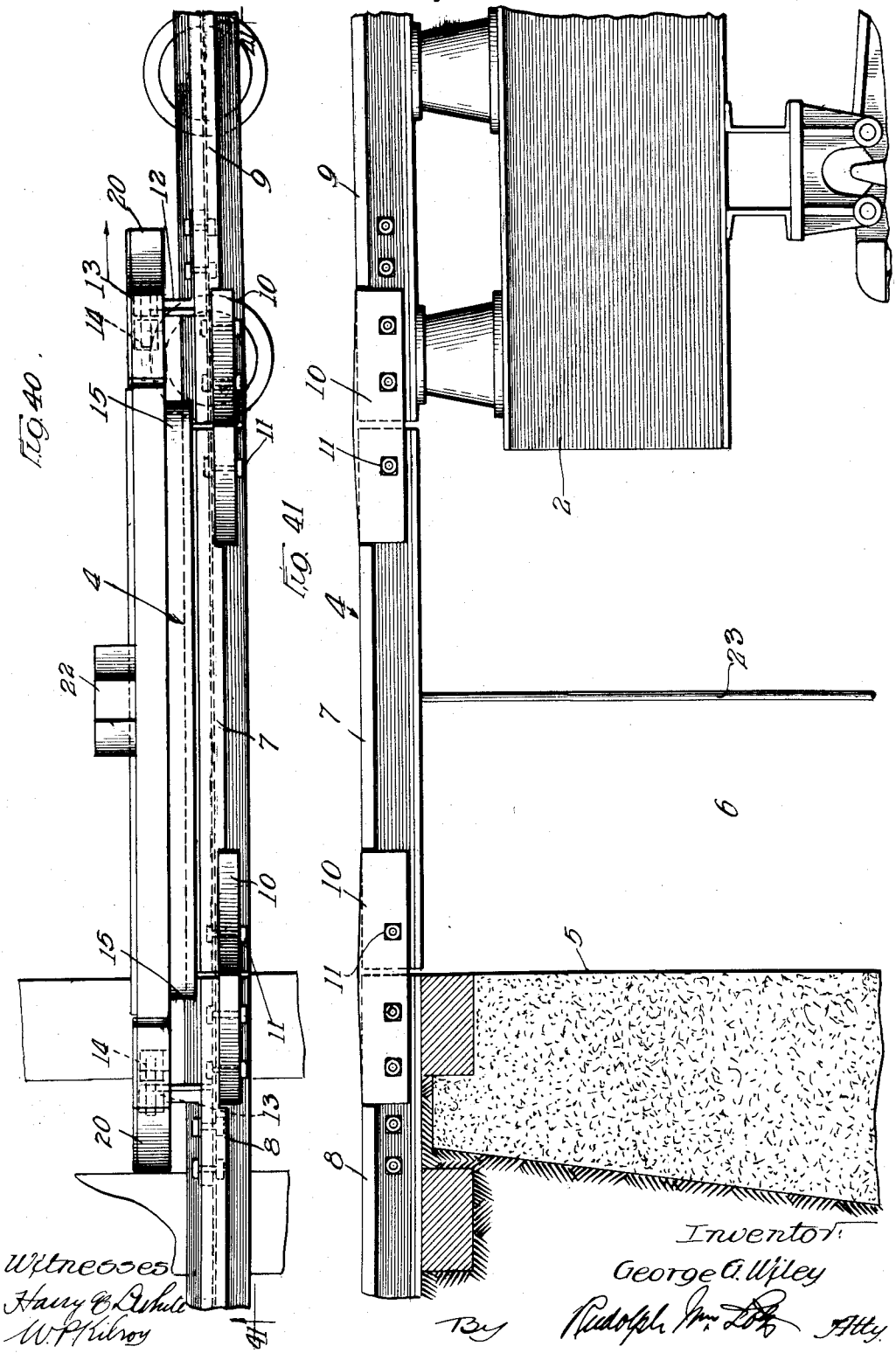

Aug. 31, 1926.  1,597,853
G. G. WILEY
DOUBLE CONTROL RECORDING TRACK SCALE
Filed May 10, 1924   31 Sheets-Sheet 18
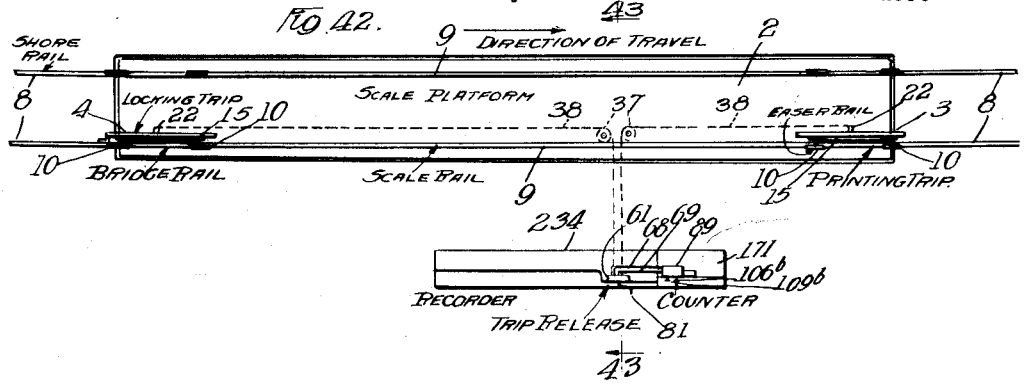
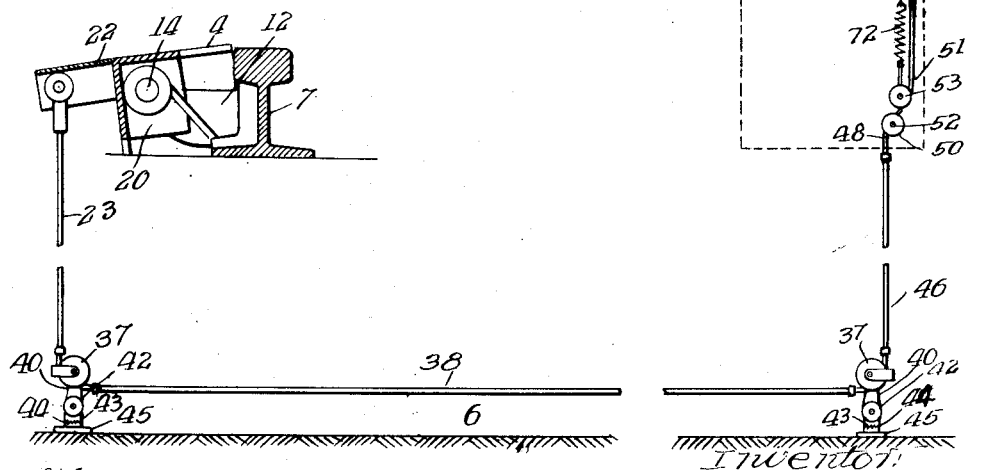

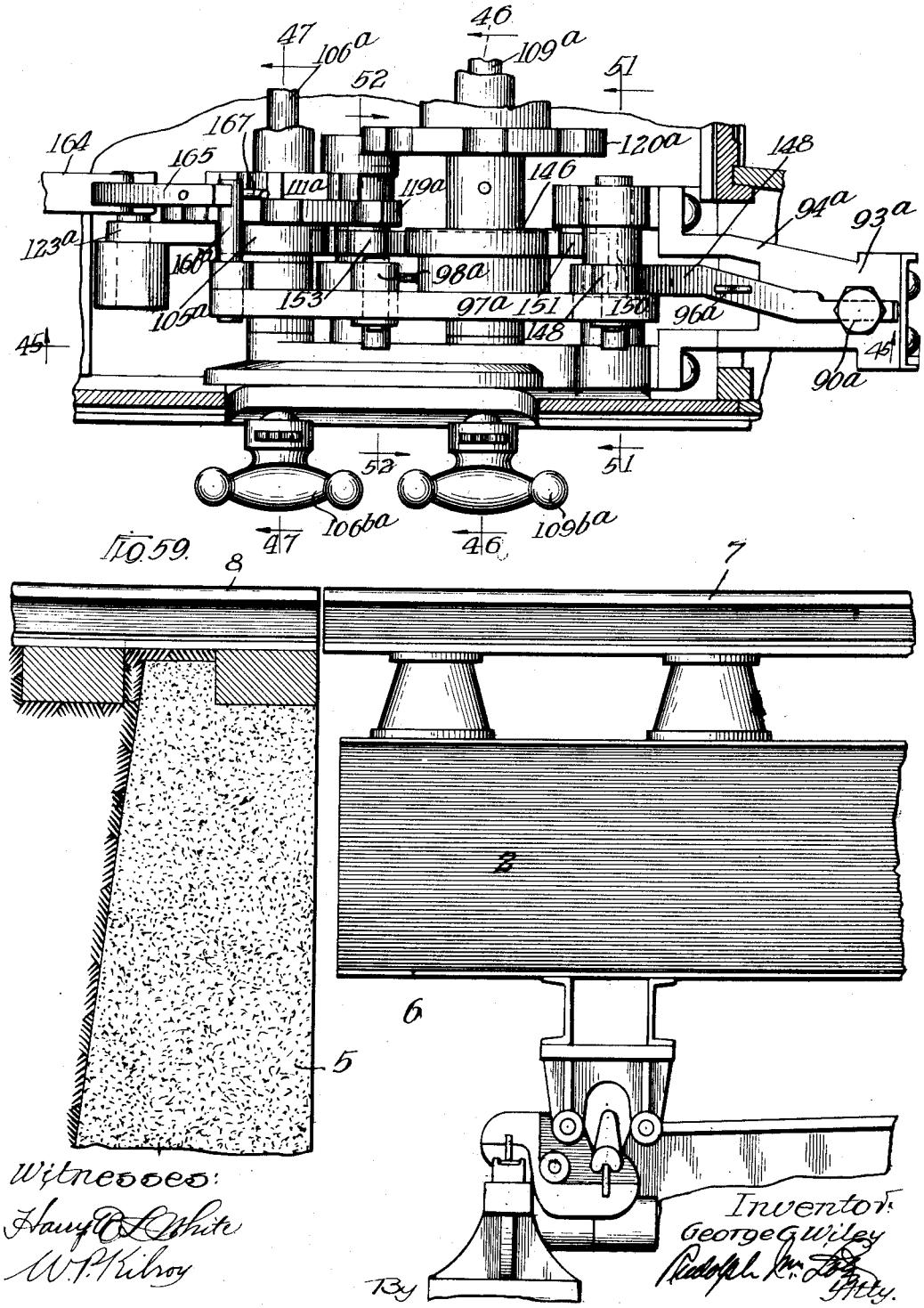

Aug. 31, 1926. 1,597,853
G. G. WILEY
DOUBLE CONTROL RECORDING TRACK SCALE
Filed May 10, 1924 31 Sheets-Sheet 20
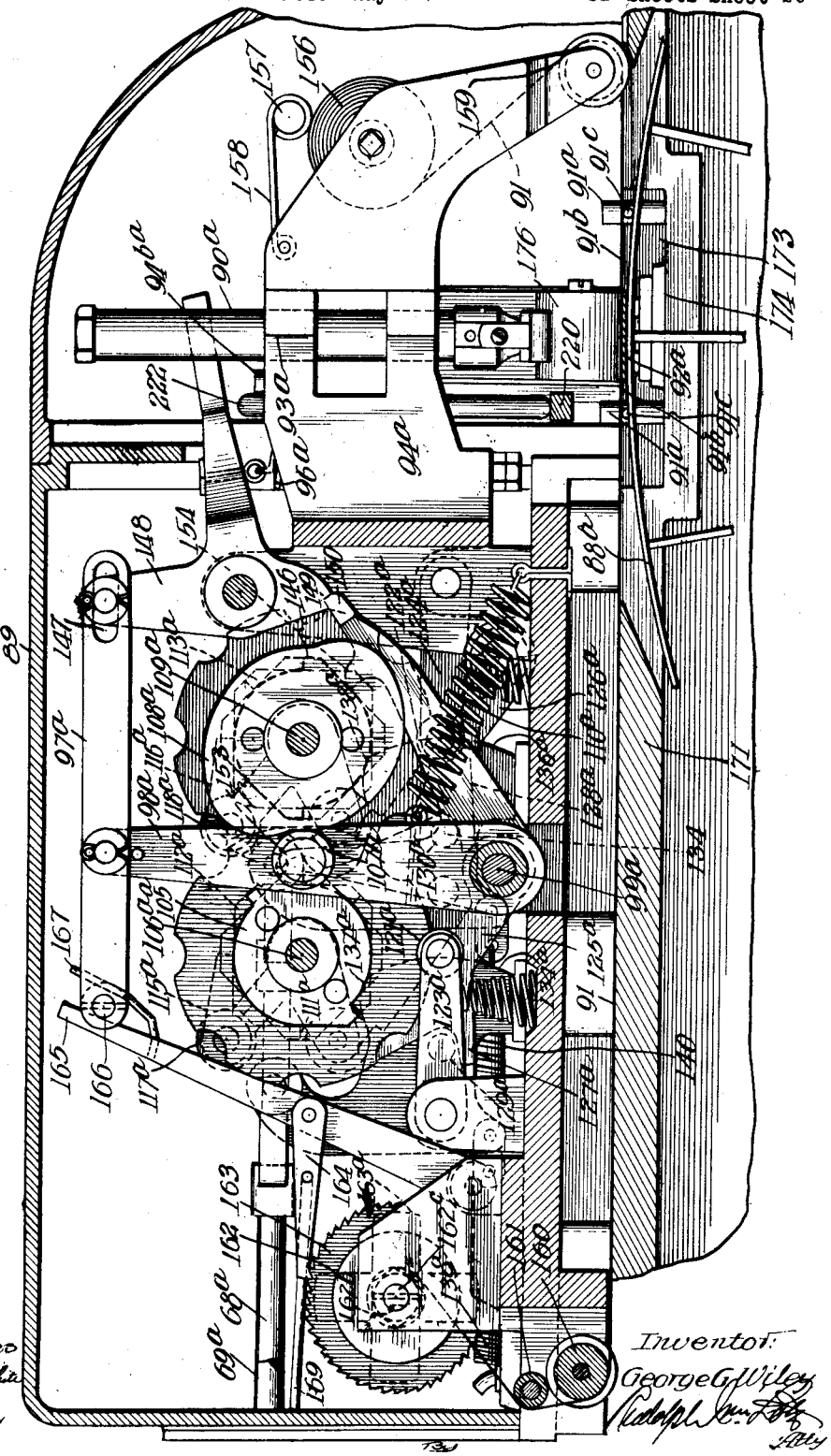

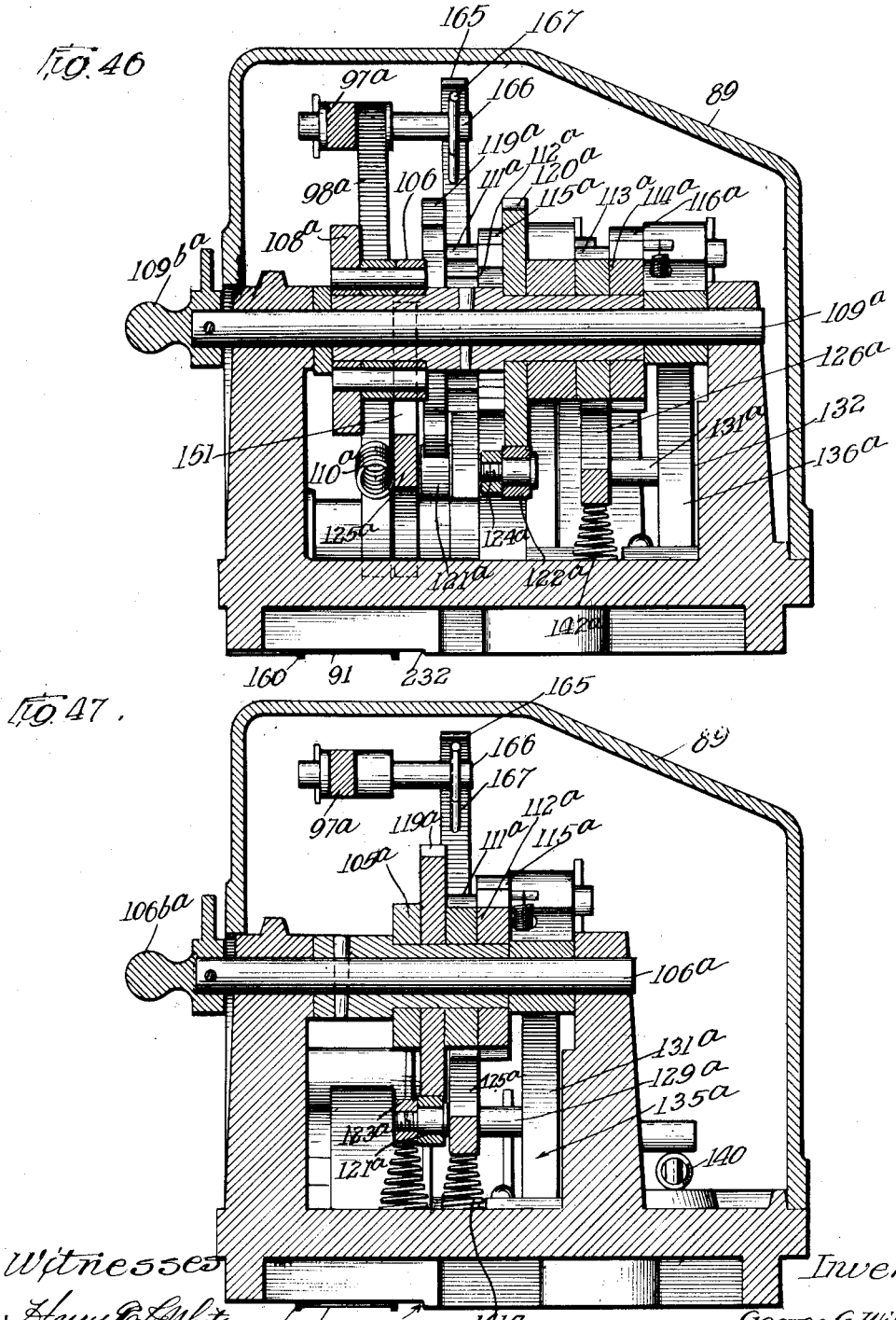

Aug. 31, 1926.
G. G. WILEY
1,597,853
DOUBLE CONTROL RECORDING TRACK SCALE
Filed May 10, 1924  31 Sheets-Sheet 22
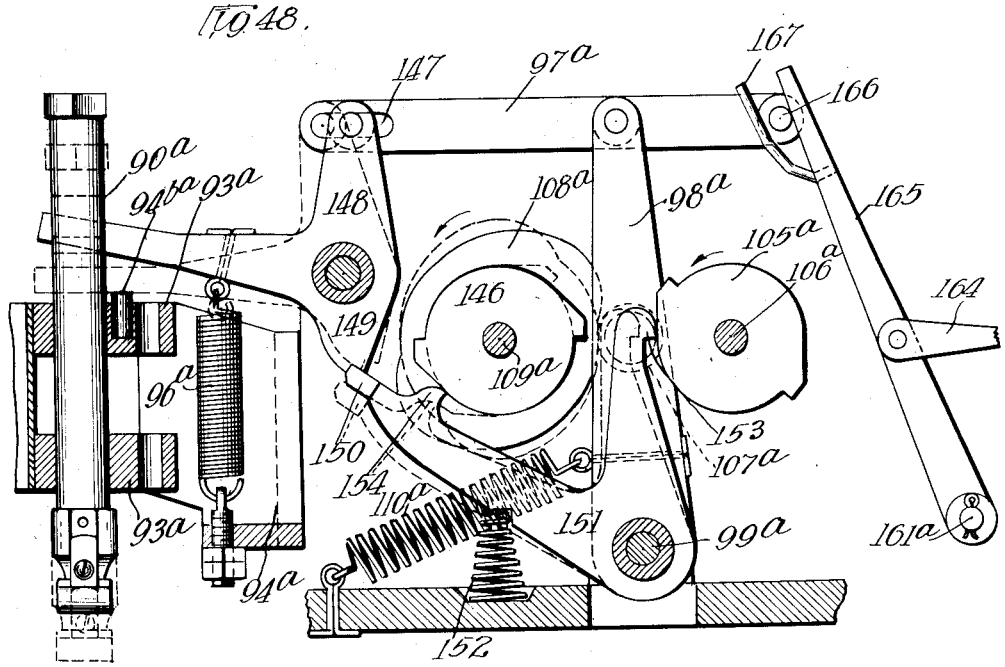
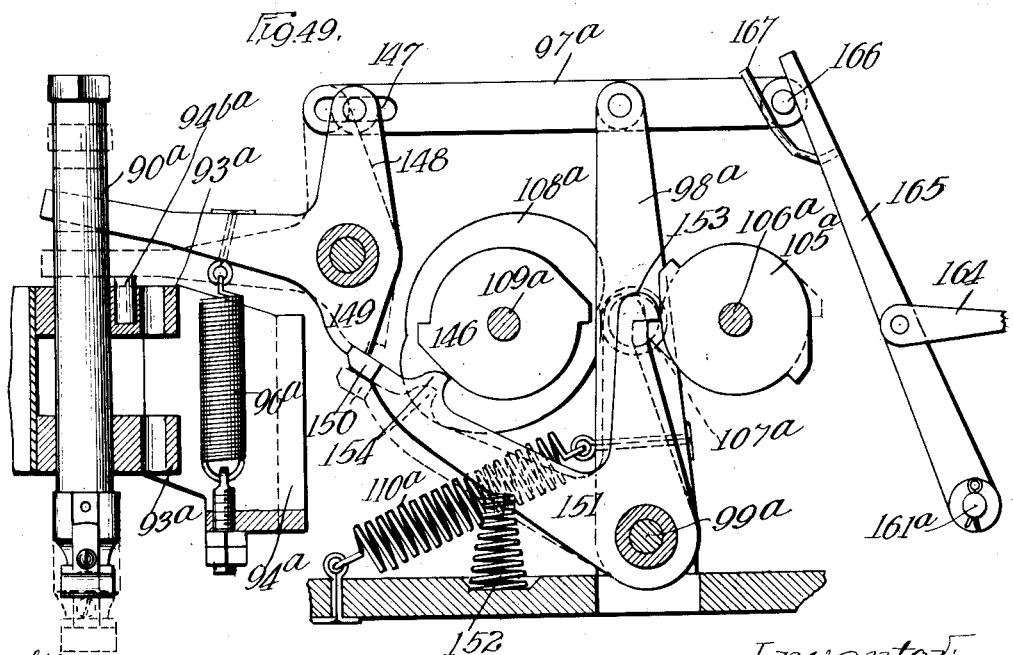
Witnesses:
Harry L. White
W. F. Kilroy
Inventor
George G. Wiley
By Rudolph Wm. Lotz Atty Aug. 31, 1926. 1,597,853
G. G. WILEY
DOUBLE CONTROL RECORDING TRACK SCALE
Filed May 10, 1924 31 Sheets-Sheet 23
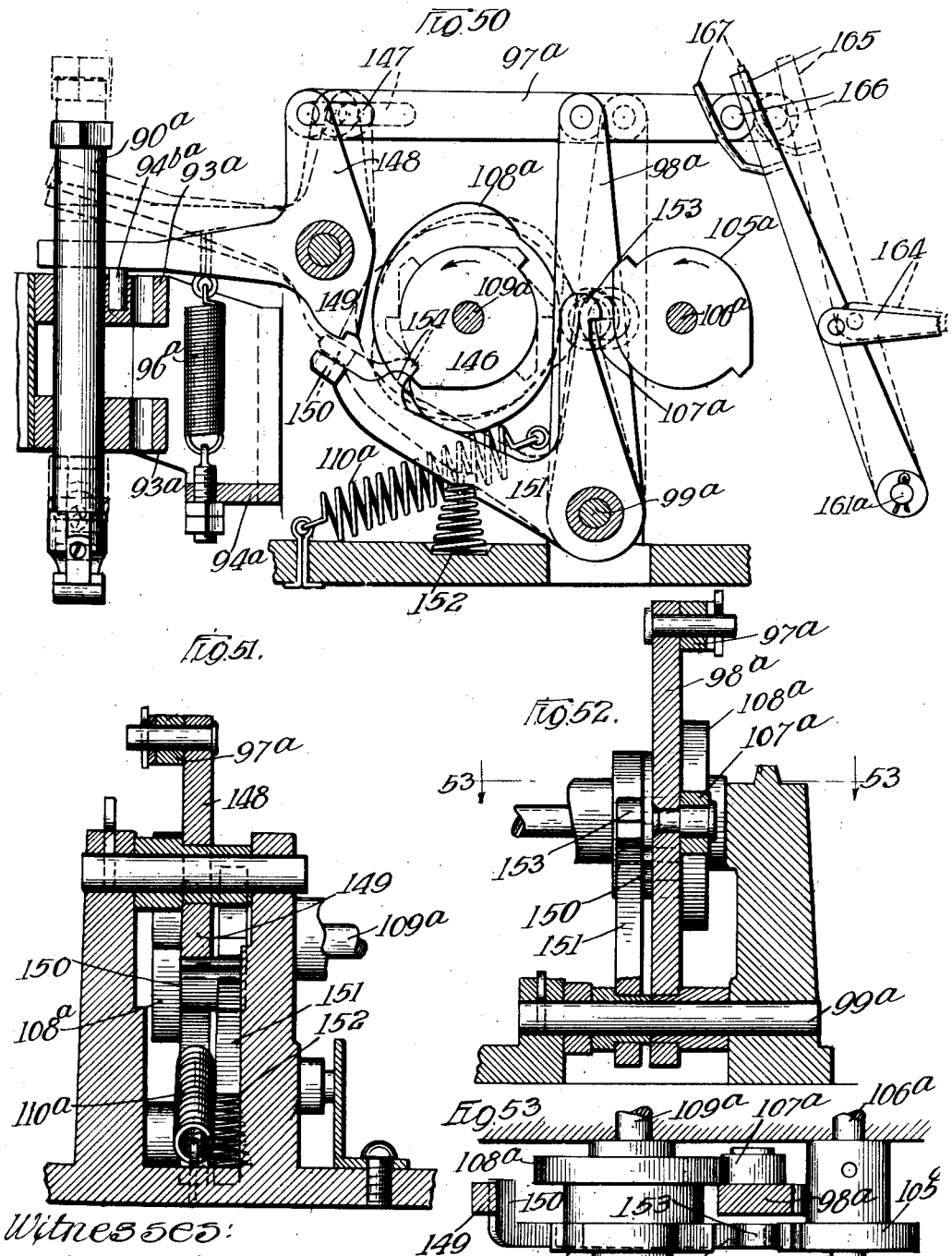

Aug. 31, 1926.  
G. G. WILEY  
DOUBLE CONTROL RECORDING TRACK SCALE  
Filed May 10, 1924   31 Sheets-Sheet 24  
1,597,853
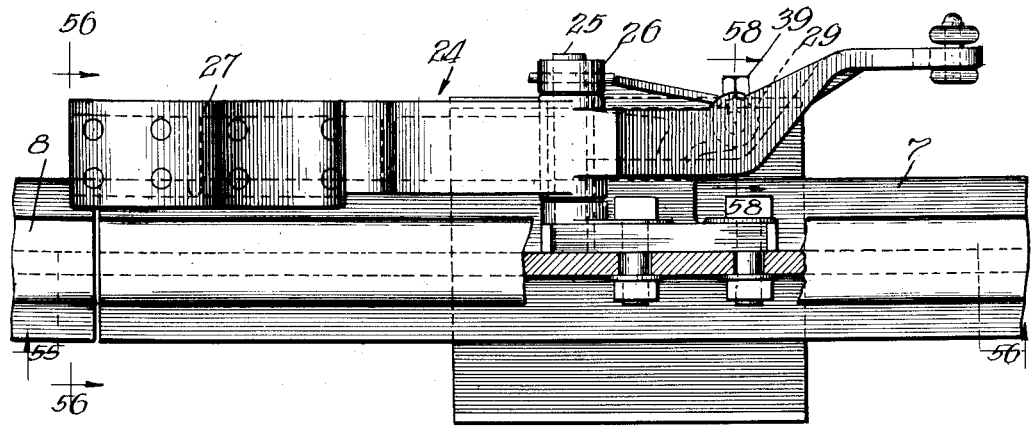
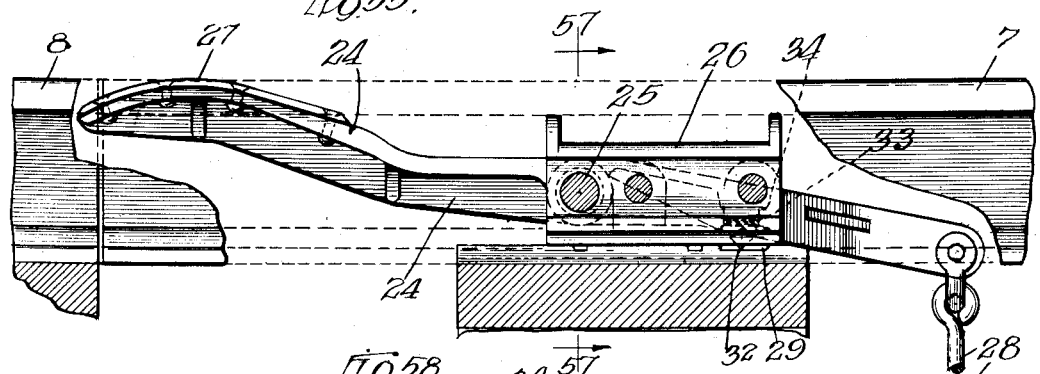
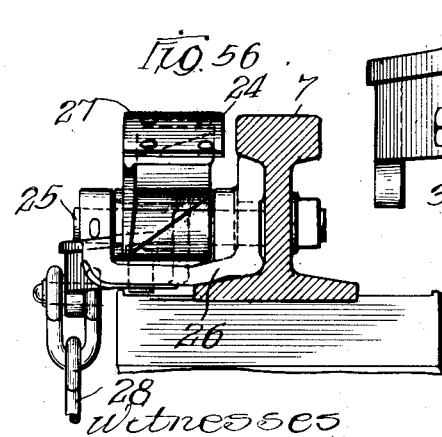
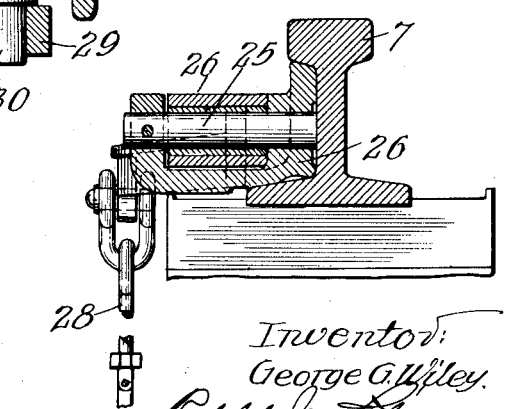

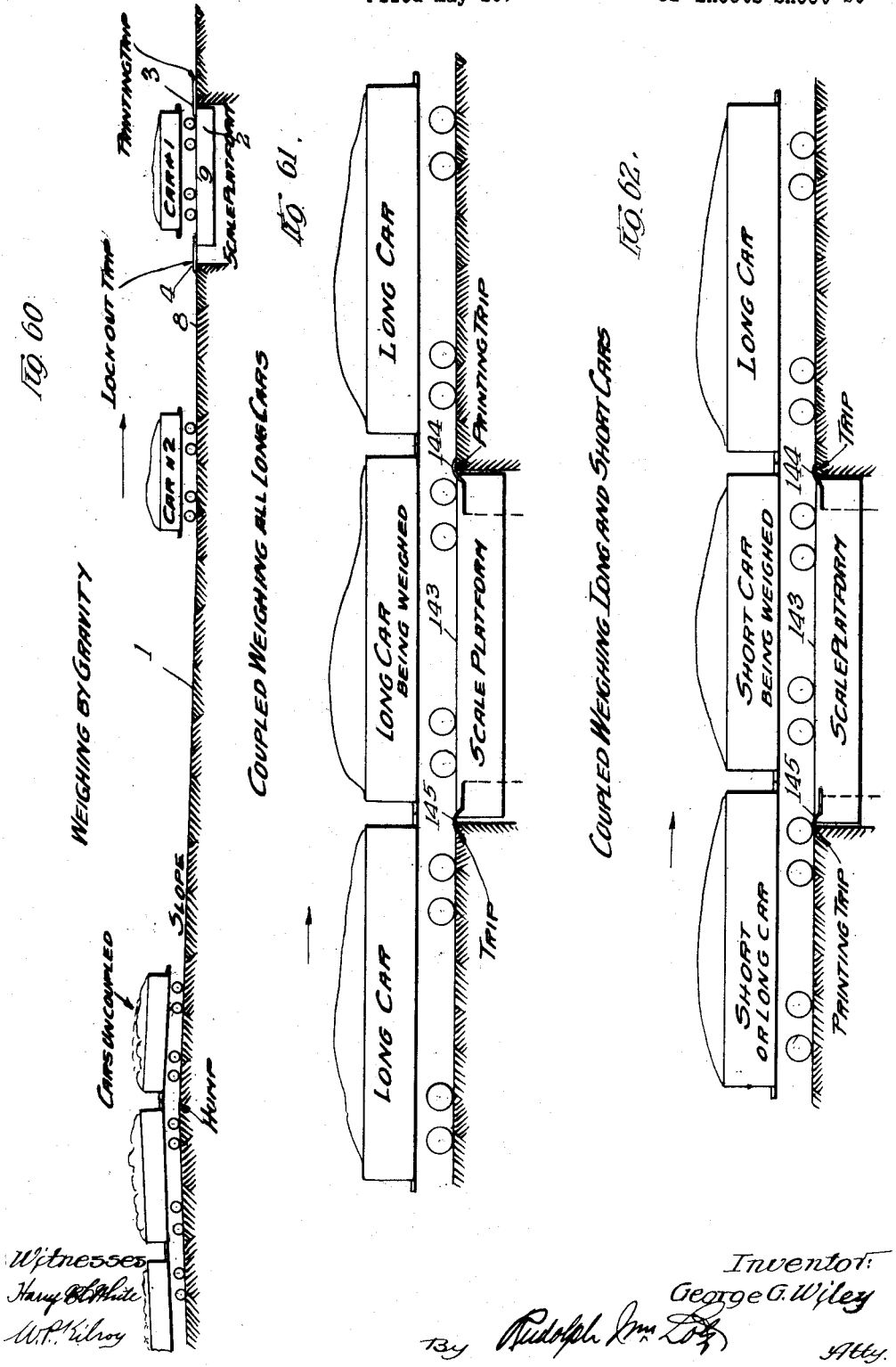

Aug. 31, 1926.  
G. G. WILEY  
1,597,853
DOUBLE CONTROL RECORDING TRACK SCALE
Filed May 10, 1924    31 Sheets-Sheet 26
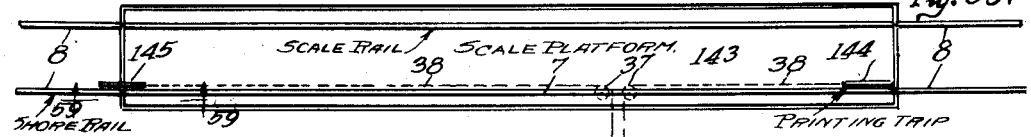
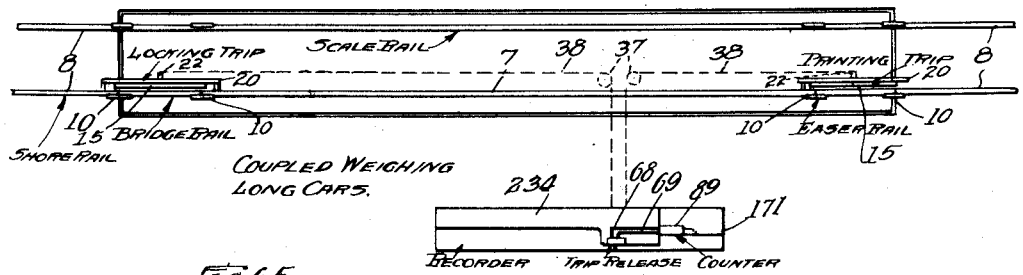
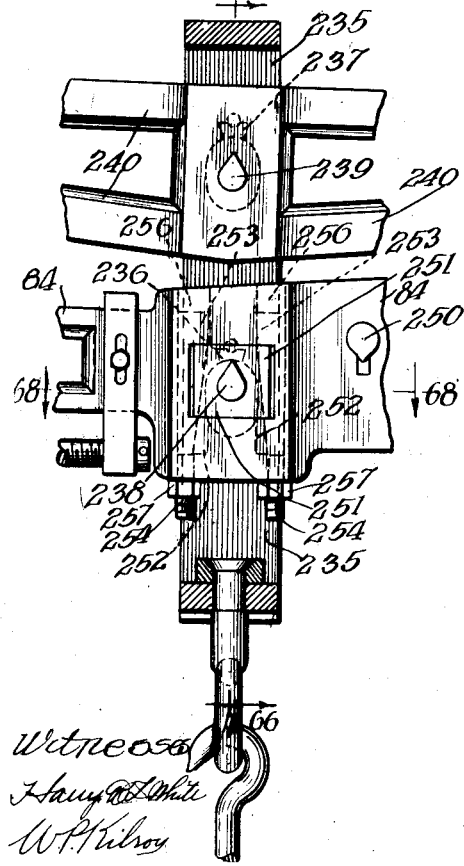
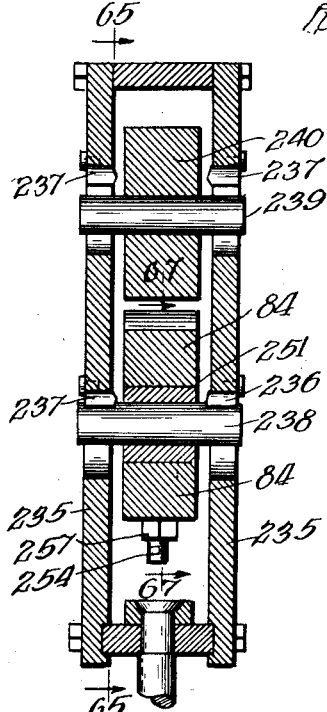
Inventor  
George G. Wiley Aug. 31, 1926.  
G. G. WILEY  
DOUBLE CONTROL RECORDING TRACK SCALE  
Filed May 10, 1924    31 Sheets-Sheet 27
1,597,853
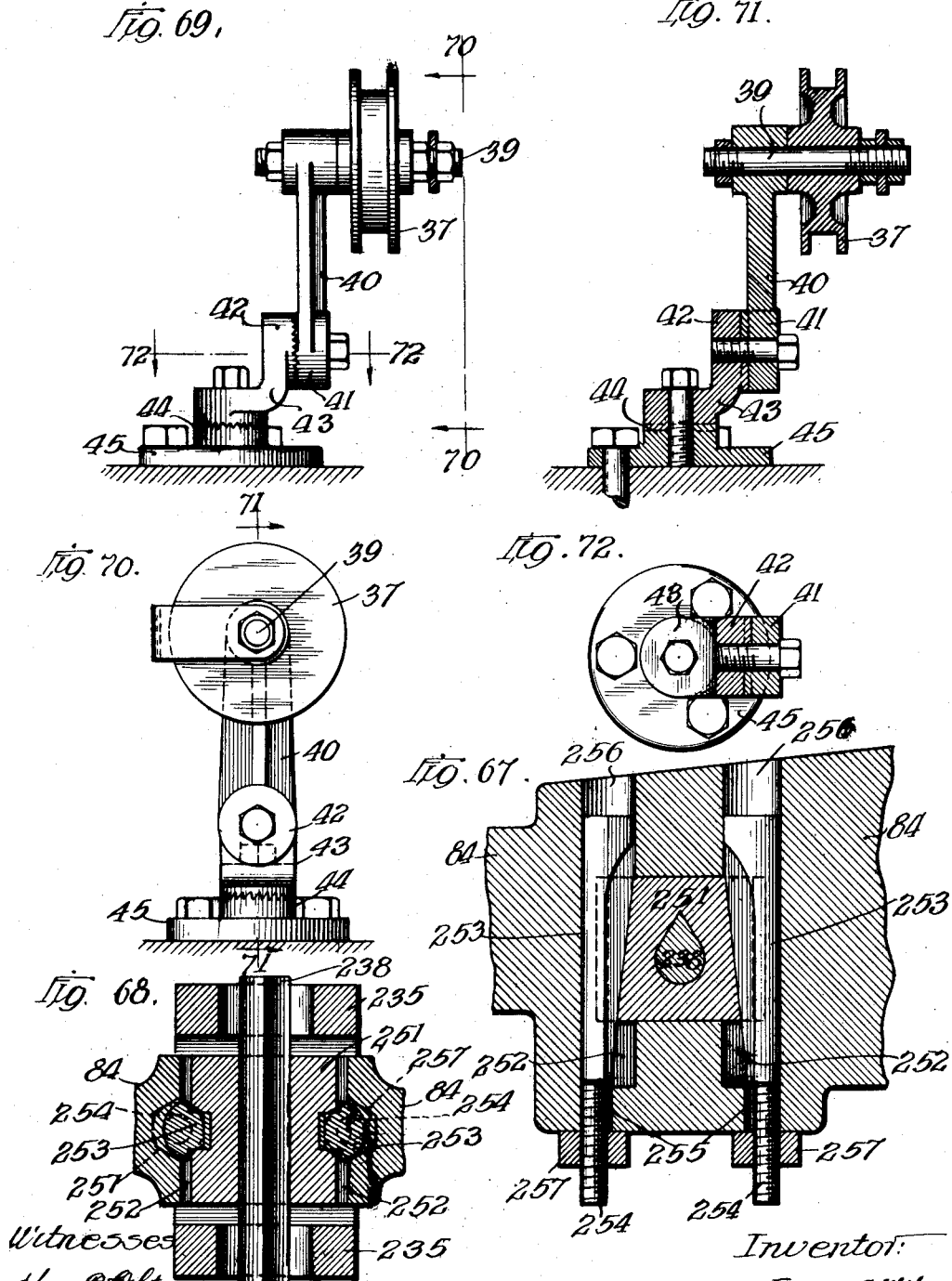

Aug. 31, 1926.
G. G. WILEY
1,597,853
DOUBLE CONTROL RECORDING TRACK SCALE
Filed May 10, 1924 — 31 Sheets-Sheet 28
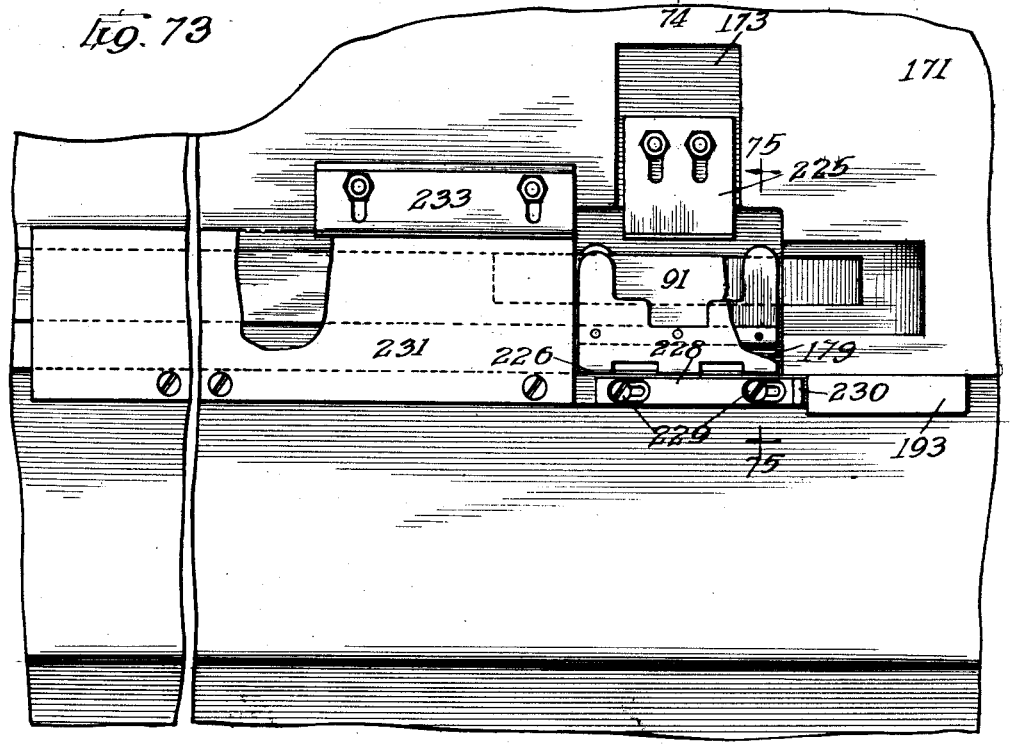
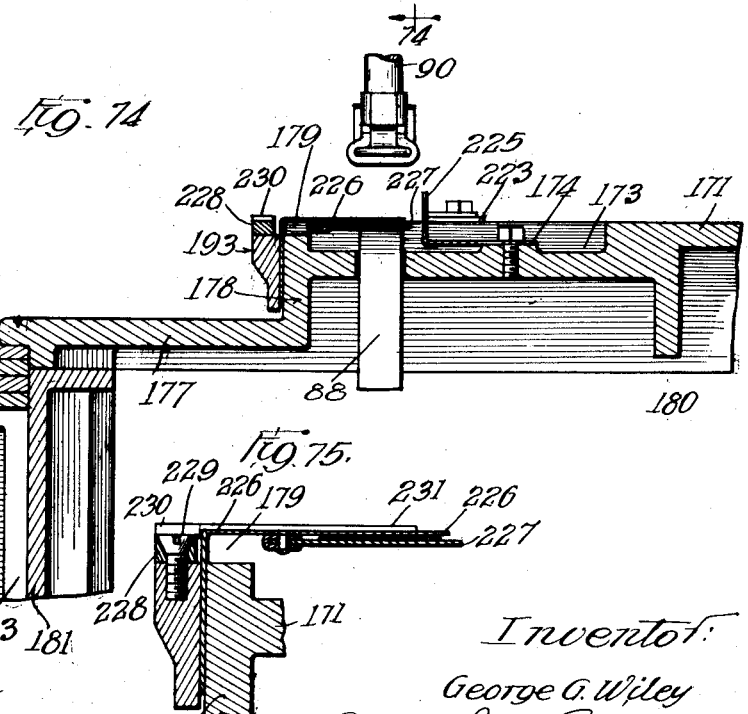

Aug. 31, 1926.
G. G. WILEY
1,597,853
DOUBLE CONTROL RECORDING TRACK SCALE
Filed May 10, 1924     31 Sheets-Sheet 29
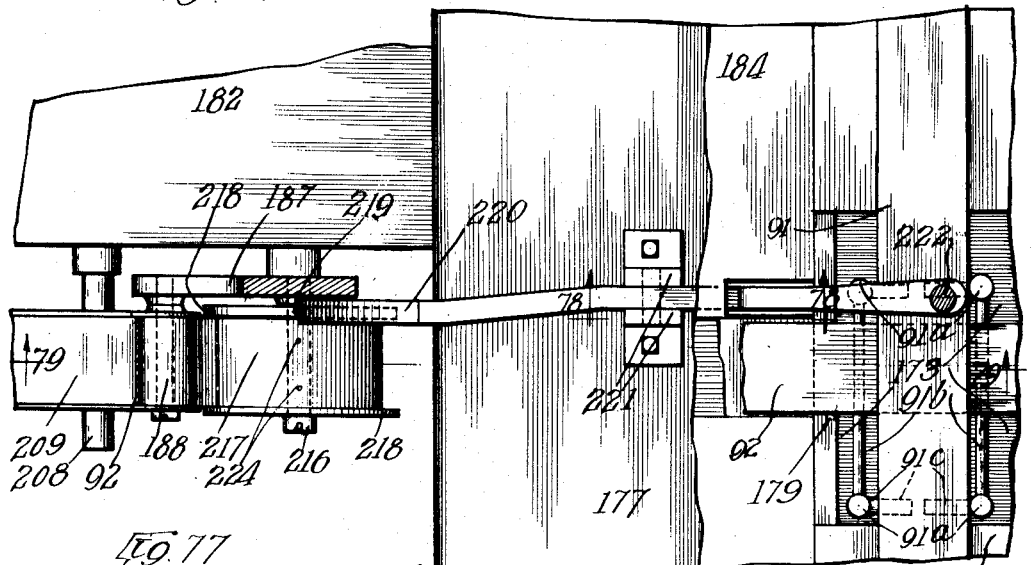
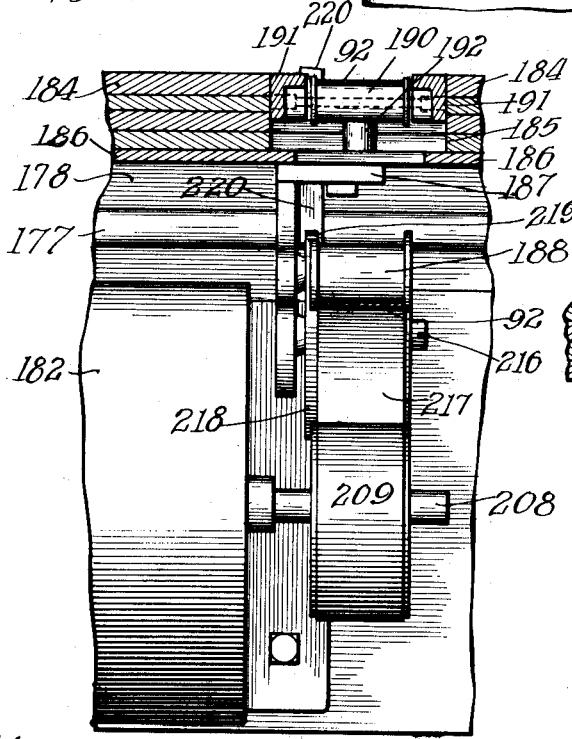
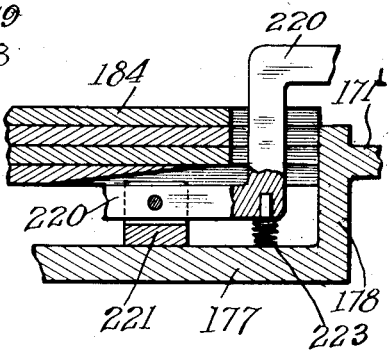
Inventor
George G. Wiley

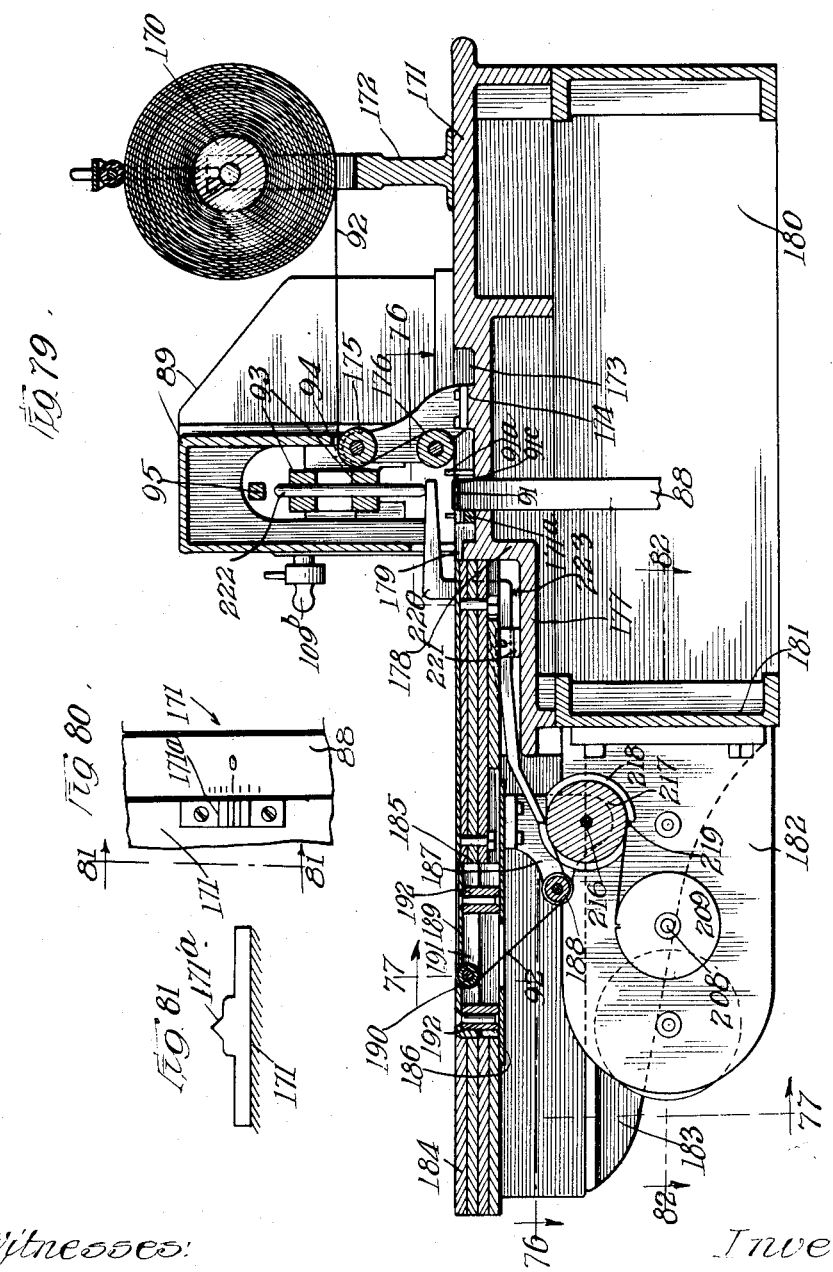

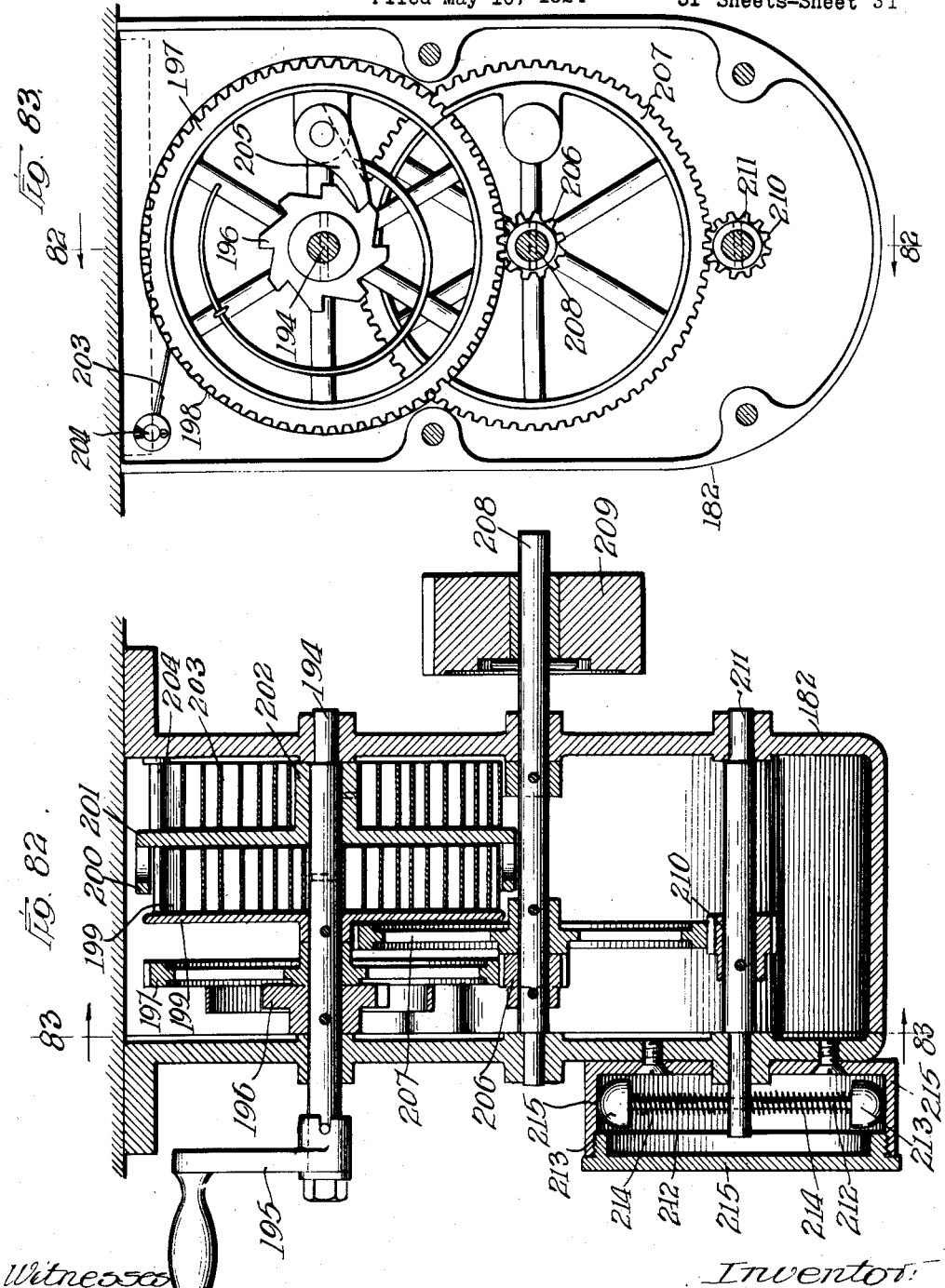

Patented Aug. 31, 1926.

1,597,853

UNITED STATES PATENT OFFICE.

GEORGE G. WILEY, OF CHICAGO, ILLINOIS, ASSIGNOR TO STREETER-AMET WEIGHING & RECORDING COMPANY, OF CHICAGO, ILLINOIS, A CORPORATION OF ILLINOIS.

DOUBLE-CONTROL RECORDING TRACK SCALE.

Application filed May 10, 1924. Serial No. 712,288.

This invention relates to automatic weight recording scales and more particularly to weighing scales of this class used on railways to weigh cars while in travel over the scale platform.

The main object of the present invention is to provide weight-recording mechanisms adapted for two types of said railway scales, namely, that type known as "gravity weighing" wherein uncoupled cars are passed successively over the platform, and that type known as "coupled weighing" wherein coupled cars in a train are passed successively over the scale-platform, and wherein the car succeeding that upon the scale-platform controls the weight recording mechanism under certain conditions to effect a predetermined result as is hereinafter fully explained.

More specifically, the present invention has for its object to provide weight recording mechanism for scales of the types stated, which is controlled from two points in the travel of successive cars to be weighed to thereby either prevent the recording of the weight of the car on the platform or cause the next succeeding car to effect recording of the weight of the car on the platform, depending upon the particular type of weighing, namely "gravity" or "coupled" for which the scale is used.

A further object of the invention is to provide a weight recording scale of the class specified wherein the weight recording mechanism is so associated with the rails on which the cars to be weighed travel, as to permit control of recording of the weight of a car on the platform to be effected by a car about to pass upon the platform to either prevent or effect recording of the weight of the first-mentioned car without thereby preventing or interfering with the recording of the weight of the next succeeding car after it is on the platform. In "gravity weighing" this is important in that it obviates the necessity of repassing both cars over the scale-platform in event of lockout of the recording mechanism for effecting record of weight of the first car by reason of too close succession of the next succeeding car.

A further object of the invention is to provide weight recording mechanisms possessing the characteristics above set forth which are, in the main, exactly alike and very easily modified by substitutions of certain parts or elements to adapt one main mechanism to scales for both types of weighing specified and also for so-called "two-cycle" or "four-cycle" operation. By two-cycle is meant two operating impulses for the passage of one car for effecting a recording operation and resetting of the mechanism. By four-cycle is meant the accomplishment of the same result by four operating impulses per car to effect a recording operation and resetting.

A further object of the invention is to provide simple and efficient means for adjusting the scale-beam for accurate weighing by shifting its pivotal axis.

Another object of the invention is to provide simple and efficient manually operable means for rendering the weight recording mechanism inoperative to prevent recording of weights of empty cars passing over the scale-platform.

A further object of the invention is to provide weight printing mechanism adapted to print either on a traveling tape or on digitally inserted tickets or cards.

Another object of the invention is to provide a tape-feeding motor possessing certain advantages as hereinafter fully pointed out.

Other objects of the invention will be hereinafter pointed out in connection with description of the embodiment shown in the accompanying drawings.

Embodiments of the invention adapting the same to the several purposes and accomplishment of the several objects above and hereinafter enumerated, are illustrated in the accompanying drawings wherein:—

Fig. 1 is a fragmentary top plan view of the housing of the recording mechanism of a scale constructed in accordance with the invention.

Fig. 2 is a front elevation of the same.

Fig. 3 is a view in elevation of the pivot-end portion of the scale-beam and a portion of the framing together with means for converting the scale into a hand-beam scale in event of disorder.

Fig. 4 is a plan section on the line 4—4 of

Fig. 5 of that mechanism of the scale usually termed the "counter", which controls the recording of weight.

Figs. 5, 6, 7, 8, 9, 10, 11, and 12, are, respectively, sectional views on the lines 5—5, 6—6, 7—7, 8—8, 9—9, 10—10, 11—11 and 12—12 of Fig. 4.

Figs. 13 and 14 are fragmentary detail sections on the lines 13—13 and 14—14, respectively of Fig. 12.

Figs. 15, 16 and 17 are sectional views on the lines 15—15, 16—16 and 17—17, respectively, of Fig. 4.

Fig. 18 is a detail section on the line 18—18 of Fig. 4.

Figs. 19 and 20 are sectional views on the lines 19—19 and 20—20, respectively, of Fig. 18.

Fig. 21 is a diagrammatic view showing cam positions explanatory of operations.

Fig. 22 is a sectional view on the lines 22—22 of Figs. 1 and 23 illustrating means for throwing the recording mechanism out of action.

Fig. 23 is a section on the line 23—23 of Fig. 22.

Fig. 24 is an elevation on the line 24—24 of Fig. 23.

Fig. 25 is a section on the line 25—25 of Fig. 22.

Figs. 26, 27 and 28 are sections on the lines 26—26, 27—27 and 28—28 of Fig. 22.

Fig. 29 is an elevation of the mechanism shown in Fig. 30 looking from the line 29—29 of said Fig. 30.

Fig. 30 is a section on the line 30—30 of Fig. 29.

Fig. 31 is a section on the line 31—31 of Fig. 29.

Fig. 32 is a section on the line 32—32 of Fig. 30.

Fig. 33 is a plan view showing a part of a rail on the scale-platform and a track-lever associated therewith for actuating the counter.

Fig. 34 is a side elevation seen from the line 34—34 of Fig. 33.

Figs. 35, 36 and 37 are detail sections on the lines 35—35, 36—36 and 37—37, respectively, of Fig. 33.

Fig. 38 is a section on the line 38—38 of Fig. 33.

Fig. 39 is a section on the line 39—39 of Fig. 38.

Fig. 40 is a plan view showing a bridge rail and a track-lever.

Fig. 41 is a fragmentary sectional view on the line 41—41 of Fig. 40.

Fig. 42 is a diagrammatic plan view of a portion of the railway including the scale platform of a "gravity" weighing scale explanatory of operation.

Fig. 43 is a diagrammatic section of the line 43—43 of Fig. 42.

Fig. 44 is a fragmentary plan view, partly in section, of the counter mechanism for a "coupled-weighing" installation.

Figs. 45, 46 and 47 are sectional views on the lines 45—45, 46—46 and 47—47, respectively, of Fig. 44.

Figs. 48, 49 and 50 are diagrammatic views of the main portions of the mechanism shown in Figs. 44 to 47, to illustrate the operations of said mechanism.

Figs. 51 and 52 are sectional views on the lines 51—51 and 52—52, respectively, of Fig. 44.

Fig. 53 is a section of the line 53—53 of Fig. 52.

Fig. 54 is a plan view, partly in section, of a rail fragment equipped with a short or "four-cycle" track-lever.

Figs. 55 and 56 are sectional views on the lines 55—55 and 56—56, respectively, of Fig. 54.

Fig. 57 is a section on the line 57—57 of Fig. 55.

Fig. 58 is a section on the line 58—58 of Fig. 54.

Fig. 59 (sheet 19) is a fragmentary detail section on the line 59—59 of Fig. 60.

Fig. 60 is a diagrammatic view of an installation for gravity weighing.

Figs. 61, 62, 63 and 64 are diagrammatic views of installation for coupled-weighing.

Fig. 65 is a fragmentary detail section showing means for effecting micrometer adjustment of the scale-beam pivot relatively to the scale-beam, taken on the line 65—65 of Fig. 66.

Fig. 66 is a section on the line 66—66 of Fig. 65.

Fig. 67 is a section on the line 67—67 of Fig. 66.

Fig. 68 is a section on the line 68—68 of Fig. 65.

Fig. 69 is a view in elevation of an adjustable idle guide roll employed.

Fig. 70 is an elevation seen from line 70—70 of Fig. 69.

Fig. 71 is a section on the line 71—71 of Fig. 70.

Fig. 72 is a section on the line 72—72 of Fig. 69.

Fig. 73 is a fragmentary plan view of a means for printing weight records on digitally inserted cards.

Figs. 74 and 75 are sections on the lines 74—74 and 75—75, respectively, of Fig. 73.

Figs. 76 and 77 are sections of the lines 76—76 and 77—77 of Fig. 79.

Fig. 78 is a section on the line 78—78 of Fig. 76.

Fig. 79 is a section on the line 79—79 of Fig. 76.

Fig. 80 is a plan view of a gauge for indicating the proper initial position of the type-wheel.

Fig. 81 is a section of same on the line 81—81 of Fig. 80.

Fig. 82 is a section on the lines 82—82 of Figs. 79 and 83.

Fig. 83 is a section on the line 83—83 of Fig. 82.

In the weighing of loaded railway freight-cars, the most modern practice is to pass the cars over a scale-platform so that they are weighed while in motion. For this class of work two distinct types of scales are employed, one type being adapted for use in gravity switch-yards where trains are made up. In this type of scale a relatively long scale-platform is used, for the reason that cars shunted over the same travel at a speed sometimes as high as twenty miles an hour. The length of the platform must, therefore, be such that the weighing mechanism will be brought to correct weight indicating position between the moment that the rear wheels of a car have first passed upon the platform and the moment just preceding the passage of the front wheels from the platform during travel at the maximum speed approximating twenty miles an hour.

In this type of scale the cars to be weighed must be uncoupled and must not pass over the platform at such frequency as to cause a second car to enter upon the platform before the preceding car has passed from it, as this would obviously defeat correct weighing of the last-named car. Carelessness frequently causes this too rapid succession of cars and the reweighing of every car which is too soon succeeded by another.

In further explanation of the objects of the invention, it will be apparent from the following specification that the mechanism for recording indicated weights is such that if a second car too closely succeeds that on the platform, the mechanism for recording weight will be automatically rendered inoperative to record the weight of the first car, but will record the weight of the second car unless it also is too quickly succeeded by a third car. In this way the reweighing of more than a minimum number of cars is obviated.

The other type of weighing consists in passing a train of coupled cars slowly over a scale-platform which is of a length to accommodate the longer cars and exceeds the minimum length necessary for this by the distance approximately equal to that between rear wheels of one car and the front wheels of the next succeeding car. Such trains are frequently made up of long and short cars and the weight indicating and recording mechanism must, therefore, meet this condition.

In the first-mentioned or gravity-type scale, the mechanism controlling the recording of weights is so constructed that if the second car reaches the platform before the car on the platform has reached the far end of the latter and tripped the lever which effects weight-recording, then the second car will trip a lever which will effect locking out or rendering inoperative the recording mechanism, so that the car on the platform will pass off without actuation of the recording mechanism. Both cars, however, reset the mechanism so that the weight of the second car will be recorded.

The coupled-weighing type differs from the gravity-type in that if the car on the scale-platform does not reach the far end of the latter and trip the recording mechanism before the next succeeding car is about to pass upon said platform, then the last-named car trips the recording mechanism so that the weight of the car on the platform will be recorded as well as that of the succeeding car.

The mechanism controlling the recording of weights is practically the same in both types.

Referring first to Sheet 25 of the drawings, Fig. 60, is diagrammatically illustrative of a customary gravity-weighing installation, it will be noted that at the left there is a train of cars. This train is actuated by a switch engine at the left (not shown) which reciprocates it toward and from the top of the slope 1 leading to the scale-platform 2, the end-cars of the train being successively uncoupled and shunted on to the slope 1.

At the right-hand end of the platform 2 is a trip-lever 3 which is actuated by the front wheel of the car on the platform as it is about to pass off. This will be referred to as the "printing trip."

At the left-hand end of the platform is a trip-lever 4 so disposed that it will be actuated by the front wheel of an approaching car just before it passes off solid ground on to the bridge-rail leading to the scale-platform. The trip 4 will be referred to as the "lockout trip."

These trip-levers may be of any one of the several types illustrated on Sheets 15, 16, 17 and 24.

In the gravity-type scales (Sheet 17), both ends of the scale-platform 2 are spaced from the wall 5 of the pit 6 a considerable distance, this space being bridged by a bridge-rail 7 which is pivotally associated with the ground-rails 8 and scale-platform rails 9 so as to prevent shock to the platform and impose the weight thereon quite gradually. It is conveniently termed the "bridge" rail 7 and will be so referred to herein.

To further prevent shock and jar, the open spaces or joints between the "bridge" rail 7 and the rails 8 and 9 are bridged by the easer wall 10 which is rigidly bolted to the webs of the rails 8 and 9, the treads of which and of the easer rail are cut away flush with the face of the web with which the plates contact, to accommodate the latter. The bridge rail 7 is pivotally connected by means of bolts 11 to said easer rail 10. The latter are provided with inclined or curved top surfaces, the apexes of which are in line with the open spaces between the rails 7, 8 and 9 and extend slightly above the levels of the treads of said rails. The said easer rail 10 is mounted on the outer faces of the webs of the rails to prevent interference with the flanges of the car-wheels.

Mounted upon the inner faces of the webs of the rails 8 and 9 are the brackets 12 for the bearings 13 for the pivot pins 14 of the trip-lever 4 which is adapted to rock on an axis substantially parallel with said rails 8 and 9. One curved end 15 of said trip-lever 4 is disposed in advance of the open space between the rails 7 and 8, and the other similar end thereof is disposed beyond the space between rails 7 and 9.

The element 4 (Figs. 35 and 36, Sheet 16) constitutes only the shoe of the trip-lever which includes the angle-iron 16 mounted on the pivot-sleeves 17 in which the pivot-pins 14 are rigidly secured by means of the set-screws 18. Integral with the sleeves 17 are L-shaped projections 19 extending beyond one end thereof parallel with the axis of same. The angle-iron 16 is riveted to said projections 19.

Inclined shoes 20 are mounted upon the ends of the angle-bar 16. The shoe 4 is also riveted to the substantially horizontal flange of the angle-bar 16.

The downwardly extending flange of the angle-bar 16 carries the bracket 21 and its protecting hood 22. Pivotally connected with said bracket 21 is the tension rod 23 which, by reason of its association with other parts, as hereinafter described, serves to normally maintain the shoe 4 at the upper limit of its movement (Figs. 35 to 37) without, however, exerting load other than its own weight on the trip-lever.

In the instance illustrated, the shoe 4 is of greater length than the bridge rail 7 and projects beyond the ends of the latter. It will accommodate all wheels (usually 2) at one side of each car-truck. It is, therefore, adapted for operation of the two-cycle recording mechanism.

The axes of the pivot pins at opposite ends of the trip-lever will obviously be thrown out of axial alignment by the slight vertical movements of the scale-platform, but the length and flexibility of the structure is such that this does not matter and, furthermore, the bearings 13 may be of such bore as to provide sufficient tolerance to prevent binding in the same.

Figs. 54 to 57 (Sheet 24) illustrate another type of trip-lever 24 known as the "short" or "four-cycle" lever which rocks on an axis perpendicular to the web of the rail. This axis consists of a pin or stud 25 of a bracket 26 bolted to the web of the rail, the lever 24 being mounted between its ends on said pin or stud. It terminates at one end in a shoe 27 disposed in the path of the flanges of the car-wheels and connects at its other end with the tension rod 28 corresponding to the rod 23.

Because of the fact that rails vary considerably in height and it is desirable that the shoes of the trip-levers shall not exceed, in normal position, the height of the rail-treads, it is preferable to provide stops for limiting the upward swing of said shoes. Thus the bracket 26 is provided with a projection 29 into which the shank 30 of a stop element 31 is fitted and held by means of set-screw 32. Washers 33 in any desired number are disposed between the head 31 of said element and said bracket 29 to determine the elevation of the top of said head with respect to a stop-formation 34 on the tail-end of the lever 24 connecting with the rod 28.

At least one of the brackets 12 is provided with a rib 35, stop-formation 36 coacting with the angle-bar 16 for limiting the upward swing of the shoe 4. The bracket 12 is provided on the lower face of its base flange with lateral ribs 12$^a$ (Fig. 34) which may be ground or filed off to fit said bracket, between the rail-head and base-flange.

It will be obvious that the two types of levers may be used interchangeably with the same recording mechanism, except that the type shown in Figs. 54 to 58 is not adapted for two-cycle operation, unless the cars are of the small four-wheel type used in mining operations. The trip-lever of Figs. 33 to 39 may be either long or short for two or four-cycle operation.

In the bottom of the pit 6 there are mounted a plurality of guide-sheaves 37 for the chains or cables 38 connecting the rods 23 or 28 with the recording mechanism. The said sheaves are arranged to rotate on horizontal or vertical axes as required and must be accurately adjusted relatively to each other and the axes of tension on the chains or cables trained over the same to prevent disengagement of the latter therefrom and to also minimize friction.

To this end each sheave 37 (Figs. 69 to 72, Sheet 27) is mounted on a stud-shaft 39 mounted in the free end of an arm 40. At the other end of said arm is a radially serrated pivot-element 41 adapted to be bolted to a similar element 42 of an angle-plate 43, or directly to a similar element 44 of a base-block 45, the angle-plate 43 being provided with two of said serrated pivot-elements. Thus the sheave 37 may be adjusted in position to rotate either on a horizontal or on a vertical axis and its position relatively to the base-block varied to suit requirements.

The chains or cables 38 connect at their other end with the tension-rods 46 and 47 (one for each of the two trip-levers 3 and 4), which are vertically disposed and connect with the chains 48 and 49 (Figs. 29 to 32, Sheet 14), which are trained over the pairs of sheaves 50—51 mounted on stud-shafts 52 and 53 carried by a bracket 54. Said chains pass between the sheaves 50 and 51 so that their lower ends become offset from their upper ends for a definite purpose. They connect at their upper ends with tension-rods 55 and 56 which in turn connect with sprocket-chains 57 and 58 trained over sprocket-wheels 59 and 60 in the housing 61 (Fig. 2, Sheet 1, and Figs. 22 to 28, Sheets 11, 12 and 13). Said sprockets 59 and 60 are rigid with cam-shafts 62 and 63 carrying cams 64 and 65 associated with the bell-crank levers 66 and 67 for actuating the plunger-rods 68 and 69 which actuate the recording mechanism. The sprockets 59 and 60 rotate on axes disposed at right angles to those of said sheaves 50 and 51. The other ends of the sprocket-chains 57 and 58 connect with tension-rods 70 and 71 which are connected with the tension-springs 72 and 73 anchored to projections of the bracket 54, the tension exerted by said springs being adjustable by turn-buckles on the rods and adjustment of the anchoring elements 74.

The said shafts 62 and 63 are journalled in bearings 75 in the vertically slidable member or carriage 76 mounted between and in engagement with the opposed parallel guide-legs 77 of an inverted V-shaped frame element 78 rigidly mounted on a part of the scale-beam supporting frame. The upper part of said frame element 78 is equipped with bearings for the rock-shafts constituting parts of the bell-crank levers 66 and 67. Mounted on said middle portion of said frame element 78 are two cushioned stops 66ª and 67ª which are disposed in the path of the cam engaging arms of the bell-crank levers 66 and 67 to prevent excessive throw thereof due to the sudden impact imparted to them by depression of the track-levers.

Associated with said guide-legs 77 and the carriage 76 is a yoke 79 equipped with a bearing for the rock-shaft 80 manually operable by the hand-lever or crank 81 at one end thereof to thereby rock a crank 82 mounted on the other shaft and connected at its outer end with a link 83 pivotally associated with said carriage 76, said link 83 and crank 82 constituting a toggle-lever for supporting the carriage to maintain the cams 64 and 65 in operative relation to the bell-crank levers 66 and 67 in a well-known manner, or permit the same to drop out of such operative relation, thereby throwing the recording mechanism out of action and relieving the springs, thereby dropping the track-levers or trips so that they will not be actuated by the car wheels.

Referring now to Sheet 1, Figs. 1 and 2, it will be noted that the scale includes the scale-beam 84 associated with the scale-platform in the usual manner and which is also associated with the dash-pot 85, balance spring 86, balance weights 87, and is geared by means of rack and pinion to the type-wheel 88.

Reference is here made to my pending applications for patents, Serial Nos. 681,540, filed Dec. 19, 1923; 681,538, filed Dec. 19, 1923; 692,647, filed Feb. 14, 1924, for detailed information relative to the last-mentioned associations and connections.

Supported upon the framework which supports the scale-beam, type-wheel, dash-pot, etc., is a housing 89 into which the rods 68 and 69 project. Within said housing there is mounted the weight-recording mechanism of which the type-wheel 88 constitutes a part. This mechanism is fully illustrated in Figs. 4 to 17 (Sheets 3 to 10) inclusive, in its adaptation of gravity-weighing.

Referring first to Sheet 4, Fig. 5, it will be seen that the rim of type-wheel 88 is disposed in the path of the printing plunger 90, a type-writer ribbon 91 being interposed between said plunger and said type-wheel for travel in one direction and a record-receiving tape 92 disposed for travel transversely of the ribbon and between the latter and the type-wheel, there being suitable mechanisms for effecting travel of said ribbon and tape as hereinafter particularly described. Said tape 91 passes over two pairs of opposed projections 91ᶜ mounted in uprights 91ª which are secured together by means of rods 91ᵇ, said uprights being thus passed and being mounted in the base-plate 171 supporting the housing 89. The tape 92 passes over the rods 91ᵇ and the same is thus normally spaced from the ribbon and the latter is spaced from the face of the type-wheel. Thus the latter is free from drag and both the ribbon and the tape are prevented from flexing or disaligning each other.

The printing plunger 90 is reciprocable in the bearings or guides 93 of the bracket 94 which carries the cushion-stop element 94ᵇ. It is provided between its ends with a slot in which one arm of a bell-crank lever 95 engages, the latter associated with the tension spring 96 which serves to impart a printing stroke to the plunger 90 when the bell-crank is released from the position shown in Fig. 5. The other arm of said bell-crank lever 95 is pivotally engaged in a longitudinal slot 96ª in a link 97 connected between its ends with the upper or outer end of a rocking lever 98 having a pivotal axis on the shaft 99. Pivotally mounted on the other end of the link 97, is a dog 100 having a bifurcated free end portion opposing the slot 96ª. A pin 101 engages in the recess of said bifurcated end and permits a limited pivotal movement of said dog 100. Said lever 95 is adapted to strike the stop 94ᵇ as a printing stroke of the plunger 90 occurs.

Pivotally mounted on the shaft carrying the bell-crank lever 95 is an arm 102 having a cam-end 103 surmounted by a shoulder 104 adapted for engagement with the free end of the dog 100.

The cam end of said arm 102 normally rests on the periphery of a cam 105 rigidly mounted on the shaft 106.

Mounted on the rocking lever 98 between its ends is a pin or roller 107 which is held in contact with the periphery of the cam 108 rigidly mounted on the shaft 109, by means of the spring 96 and the tension spring 110 connected with the said lever 98.

In the instance illustrated, the cam 105 is substantially square and presents four surfaces which are, between their ends, disposed radially nearer the axis of the shaft 106 than are its corner portions so that when said cam formation 103 rests on one of said surfaces, it is out of engaging relation to the dog 100, but when said cam-formation 103 rests on a corner of the cam 105, it will cause the shoulder 104 to oppose the dog 100 and thus prevent movement of the link 97 and bell-crank 95 from imparting a printing stroke to the plunger 90.

The cam 108 has, in the instance illustrated, four equally spaced high points or points of greatest radius, each terminating at one side in a substantially radial surface. Both said cams rotate clock-wise and it will be seen that a slight rotation of the cam 108 will bring a peripheral portion of least radius opposed to the pin or roller 107 to thus permit the springs 110 and 96 to act to impart a printing stroke to the plunger 90, provided the shoulder 104 of arm 102 is out of the path of the dog 100 at this moment.

These operations will be more readily understood by reference to Fig. 21, Sheet 9, which will be hereinafter referred to.

Rigid with each of the shaft 106 and 109 are pairs of oppositely disposed ratchets 111 and 112 (Fig. 7) on shaft 106 and 113 and 114 on shaft 109. The ratchets 111 and 113 are actuating ratchets operatively associated with the spring-held actuating pawls 115 (Fig. 7) and 116, respectively, pivotally mounted on arms of the V-shaped rockers 117 and 118 rotatably mounted on said shafts 106 and 109 respectively.

Also rigidly mounted on the shafts 106 and 109, are the disks 119 and 120, respectively, each having peripheral notches corresponding in number and spacing with the teeth of the ratchets. Rollers 121 and 122 mounted on the free ends of spring-held rocker arms 123 and 124, respectively, engage in the said peripheral notches at the end of each rotation of the ratchets through an arc representing the distance between adjacent teeth for preventing free rotation of the shafts 106 and 109 between intervals of actuation of said ratchets.

The non-actuating ratchets 112 and 114 have their teeth or shoulders opposed to and flush with the teeth of the ratchets 111 and 113 and are engaged by the spring-held stop pawls 125 and 126 at the completion of each actuating stroke of the pawls 115 and 116 (Fig. 6). Said stop pawls 125 and 126 are provided with projections 127 and 128, respectively, which are engaged by pins 129 and 130 on the rocking-cams 131 and 132, respectively. Said rocking-cams 131 and 132 are pivotally mounted on studs 133 and 134, respectively, each thereof having an arm pivotally connected with the plunger rods 68 and 69, respectively. Each cam 131 and 132 has an arcuate surface portion 135 and 136, respectively, concentric with the stud on which the cam is rotatable, and an active or actuating cam surface 137 and 138, respectively, which terminates tangentially with the inactive arcuate surfaces and extends into a hollow of which the arm of the cam connected with its plunger-rod forms one wall.

The lower arms of the V-shaped rockers 117 and 118 are equipped with rollers which are adapted to normally rest in said hollows and ride upon the active or actuating cam surfaces and the inactive arcuate surfaces of the rocking cams as the latter are actuated by their respective plunger-rods 68 and 69.

From the foregoing it will be seen that the mechanism associated with the plunger-rod 68 is absolutely identical in every detail with that associated with the plunger-rod 69 with the single exception of the respective cams 105 and 108 which differ from each other. Each of said last-named cams is actuated wholly independently of the other. Each of said mechanisms is, with change of cams 105 and 108, equally adapted for two-cycle and for four-cycle operation. That is to say, that if the long track-lever or trip-lever is used so that there will be only one actuation thereof for each car truck as distinguished from each car-wheel, then each cam will be turned through an arc of ninety degrees per car, whereas if the short lever is used it will be rotated through a half-revolution per car, the sole change in construction required being that for four-cycle operation each cam 105 and 108, respectively, shall have only two diametrically opposed points of greatest radius instead of four thereof, as shown.

Before proceeding further with description of mechanisms, I shall describe the operation of the two-cycle gravity-weighing recording mechanism just above described.

It will be obvious that the printing stroke of plunger 90 is primarily controlled by cam 108 associated with plunger 69, the latter being associated only with the printing-trip 3 at the far or delivery end of the scale-platform. The resetting of the printing plunger is also effected by said cam 108.

If we ignore the cam 105 and its associated mechanism temporarily, it is very readily seen that as a car truck passes over the printing-trip 3, the cam in the housing 54 associated with plunger-rod 69 will effect a reciprocation of said rod. The trip-levers actuated by the car-wheels are more generally termed "track-levers" and are so called in the claims.

This reciprocation will effect a rocking stroke of the cam 132, the actuating cam surface of which will cause the V-shaped rocker carrying actuating pawl 116 to rotate through an arc of exactly forty-five degrees, thus imparting one-eighth revolution to shaft 109 and cam 108. This movement is very sudden, but during the same the pin 130 will move out of the path of the arm 128 of stop-pawl 126 which instantly passes into the path of the stop-ratchet to prevent the high-speed impulse imparted to shaft 109 to cause, by momentum, a further rotation of said shaft. The engagement of the roller on the rocker-arm engaging in successive notches of the disk 119, also aids in preventing further rotation, and holds shaft 109 in position during return stroke of 132.

The rocking-cam 132 is reset by the spring 140 associated therewith, which easily overcomes the pressure of the spring 142 associated with stop-pawl 126.

The instant that the high point of the cam 108 has passed the roller 107 on lever 98, the springs 110 and 96 will conjointly act to cause the plunger 90 to effect a printing stroke, spring 110 serving only to clean slot 96ª to permit spring 96 to throw printing plunger down.

Thus, as the first truck of the car on the scale-platform strikes the printing-trip 3, a weight record is effected. As the last truck of said car strikes said printing-trip the cam 108 is reset to the full line position shown in Figs. 5 and 7.

Thus, if the cam 105 and the lever or arm 102 were omitted, the printing plunger 90 would effect a printing stroke and be reset every time a car passed from the platform. If two cars or part of another car had entered upon the platform before the first car had passed off the platform, there would be no correct record of weight of said last-mentioned car.

The function of the cam 105, the arm 102 and the dog 100 is to prevent false records of weights.

It being remembered that cam 108 is always in the position shown in Fig. 5 and in full lines in Fig. 21 immediately following the passage of a car from the platform, the lockout action of the last-mentioned mechanism will be very readily understood by reference to Fig. 21 alone.

Assume that just before the first car reaches the end of the scale-platform and actuates the printing-trip 3, the next succeeding car reaches the lockout trip 4 and actuates it. The cam in housing 54 associated with the plunger-rod 68 now effects reciprocation of the latter and, via the sequence of operations of the mechanism associated with cam 105, causes the latter to turn one-eighth revolution to the position shown in dotted lines in Fig. 21. The arm 102 is now raised to throw its shoulder 104 into the path of the dog 100. Before the rear truck of the second car strikes lockout trip 4, the first or front truck of the first car will have actuated the printing-trip to thereby throw cam 108 over to the dotted line position of Fig. 21. This permits the arm or lever 98 to move only to the position indicated by the dotted lines nearest the full lines of Fig. 21, because at this point the dog 100 strikes the shoulder 104 and prevents further movement of the link 97, bell-crank 95 and arm 98. As the arm 102 is released only by its own weight from this engagement, when the cam 105 is in its full-line position, the pressure exerted on the shoulder 104 by dog 100 will serve to retain said arm 102 in this position.

Keeping in mind that front truck of car No. 2 has preceded front truck of car No. 1 with respect to actuation of trip-lever 4 in advance of printing-trip 3, it is safe to assume that the rear truck of car No. 2 will strike lockout-trip 4 before car No. 1 again actuates printing-trip. Thus car No. 2 now resets cam 105 to full line position without thereby effecting release of arm 102 from engagement with dog 100. Hence, there can be no printing stroke of plunger 90.

Now as rear truck of car No. 1 passes over printing-trip 3, the lever 98 is returned to full-line position which prevents printing, and the dog 100 being now restored to full line position, the arm 102 is released and both mechanisms and their cams are again in normal position. The weight of car No. 1 has not been recorded but, unless car No. 2 is too closely followed by another car, its weight will be recorded.

It will be obvious also from the foregoing, that if car No. 2 should pass entirely upon the scale-platform before car No. 1 has reached the end of the latter, the above result will be the same, since an operation of the lockout trip in advance of the printing-trip will serve to maintain the printing plunger inactive until the last truck of car No. 1 has passed off the platform. This is almost impossible of occurrence in practice.

In event of too close succession of cars, the scale-master or attendant may operate the lever 81 to prevent the weight of either of the two cars being recorded. As the shafts 106 and 109 are equipped with hand-wheels 106[b] and 109[b], respectively, (Figs. 1 and 2) each having an indicating hand to show positions of the respective cams 105 and 108, the mechanisms can be quickly reset to effect recording of weight of the next succeeding car. The lever 81 may also be operated to prevent recording of weights of empty cars passed over the platform.

The rocking cam 131 is held by the tension spring 139 corresponding to spring 140, and the stop-pawl 125 is held by the spring 141 corresponding to spring 142.

In weighing coupled cars a short scale-platform is used and, as shown in Fig. 59 (Sheet 19), the bridge rail is usually omitted, though an easing device may be employed in accordance with the foregoing disclosure.

Referring now to Figs. 61 and 62, Sheet 25, it will be seen that the length of the scale-platform 143 is practically equal to the length of the body of a long car. The positions of our trucks with respect to the ends of the bodies varies considerably and the length of so-called long and short cars also varies to some extent.

At the delivery end of the platform 143 is the printing-trip 144 and on the ground-track just off the scale-platform is the second printing-trip 145. The recording mechanism associated with these trips is identical with that of the gravity-weighing installation above described, except as regards the cams thereof corresponding to the cams 105 and 108 which are, first of all, of the four-cycle type, and with respect to certain detailed modifications.

Thus, in Figs. 44 to 53 (Sheets 19 to 23), all parts of the mechanism identical with that previously described, are indicated on the drawings by the same reference numerals having the suffix "a" appended thereto.

They include the plunger rods 68[a] and 69[a], the rocking cams 131[a] and 132[a], the V-shaped rockers 117[a] and 118[a] carrying the actuating pawls 115[a] and 116[a], the peripherally notched disks 119[a] and 120[a] and the roller carrying, spring-held arms 123[a] and 124[a] associated therewith; the actuating ratchets 111[a] and 112[a], the stop-ratchets 113[a] and 114[a], the printing-plunger 90[a], and the several springs associated with the foregoing duplicate parts.

The differences in the mechanism for gravity and coupled weighing, respectively, can be best understood by reference to Figs. 48, 49 and 50 (Sheets 22 and 23), from which it will be seen that the shaft 106[a] carries a cam 105[a] having two diametrically opposed points of greatest radius which simulate ratchet-teeth, the shaft 109[a] being provided with a similar cam 146 and being also provided with a cam 108[a] having two diametrically opposed points of greatest radius and similarly opposed hollows of least radius, each forty-five degrees removed from the respective "high" points. The relative positions of the cams 108[a] and 146 are such that the "high" points of the latter are radially aligned with the "low" points of the former and are of less radius than the said "low" points.

The cam 108[a] is solely a resetting cam for the printing plunger and lies in peripheral contact with the roller between the ends of the arm or lever 98[a]. The latter is pivotally connected with the link or plunger 97[a] which is provided at one end with a longitudinal slot 147 in which a pin at the end of one arm of the bell-crank lever 148 engages, the other arm thereof being engaged with the plunger 90[a] and the spring 96[a]. Said bell-crank lever 148 is provided with a projection 149 having a notch in its free end in which the projection 150 at the free end of one arm of a V-shaped lever 151 is adapted to engage for latching the bell-crank lever 148 in position to maintain the plunger 90[a] poised for a printing stroke. Said V-shaped lever 151 is held in engaging relation to the bell-crank 148 by means of the spring 152. Each arm of the lever 151 is provided with a projection, 153 and 154, respectively, which are in contact with the arcuate surfaces of the cams 105[a] and 146, respectively, when the projection 150 is engaged in the notch of the projection 149.

The points of contact of the projections 153 and 154, with their respective cams are normally such that a printing impulse or one-eighth rotation of either of said cams will cause a high point thereof to pass the associated projection to thus release the projection 150 from its notch and thus permit a printing stroke of the plunger 90[a].

The norml relative positions of the cams 105[a] and 146 are as indicated in full lines in Fig. 48, these relative positions being determined by the points of contact of the projections 153 and 154, respectively, therewith.

It will be observed that when the printing plunger 90[a] is set ready for a printing impulse, the pin of the arm of the bell-crank lever 148 engaging in the slot 147 of link or plunger 97[a], is disposed midway between the ends of said slot, being held in this position by engagement of the projection 150 of V-shaped lever 151 in the notch of projection 148 of said bell-crank. The printing plunger is, therefore, free to effect printing without movement being imparted to arm or lever 98ª which, by reason of the arcuate peripheral portion of the resetting cam 108ª extending from each low point through an arc of about ninety degrees, retains the position shown in Figs. 48 and 49 during said printing stroke. Following the latter it is rotated through an arc of one-hundred thirty-five degrees during which one of its high points engages and passes the roller on arm or lever 98ª to turn the latter to the position shown in dotted lines in Fig. 50 to thus return the bell-crank 148 and plunger 90ª from the full line position of Fig. 50 to the farthest dotted line position, said parts being returned to the intermediate dotted line position as the cam 108ª completes its movement to the normal position shown in full lines in Figs. 48 and 49.

The operation of the last-described mechanism is as follows, reference being again had to Figs. 61 and 62, Sheet 25, and Figs. 44 to 50 inclusive (particularly Figs. 48, 49 and 50):—

If a succession of long cars passes over the platform 143 in the direction of the arrow, the first wheel passing over the trip 145 will cause a printing stroke of the plunger 90ª unless the scale-master shall have thrown over the lever 81 to prevent this. The record will, of course, indicate zero in the absence of load. As the other three wheels at one side of the first car pass over trip 145, the printing mechanism is reset and the first car is now on the platform 143. As it reaches the far end of said platform and is just about to pass off it, the first wheel will strike the trip 144 which is associated with the plunger rod 68ª and with shaft 109ª through the mediacy of the rocking-cam and ratchets above described. Depression of the trip-lever 144 will cause the shaft 109ª and cam 146 to be rotated one-eighth of a revolution to the position shown in dotted lines in Fig. 48, during which one of the high points of the said cam will pass the projection 154 of the V-shaped lever 151, thereby rocking the latter to an extent sufficient to throw the projection 150 out of the notch in projection 149 of bell-crank 148. The spring 96ª instantly imparts a printing stroke to plunger 90ª and the weight of said first car is now recorded. As the last three wheels at one side of said car pass over trip 144, the cam 146 will be reset to position shown in full lines in Figs. 48 and 49.

Before the resetting of cam 109ª has occurred, the first wheel of the succeeding car will have hit trip 145 to thereby also rotate cam 105ª through an eighth revolution, but, as the printing mechanism is not reset, no printing stroke can result. As trip 144 via shaft 109ª controls the resetting of the printing mechanism, it will be obvious that the latter will be reset only at the moment that the first car is fully off of the platform 143. At this time the several cams 105ª, 108ª and 146 will again be in the positions shown in full lines in Figs. 48 and 49 so that the foregoing operation will be repeated.

If a short car follows a long car the operation will be exactly as above, but if a short car is on the platform 143 and is followed by either a long or a short car, the operation will be as follows:—

Before the short car on the platform reaches the end of the latter to strike trip 144, the next succeeding car will be about to enter upon said platform and the first wheel thereof will strike trip 145 and thereby effect rotation of the shaft 106ª, and cams 105ª and through an eighth revolution to the position shown in full lines in Fig. 49. During this movement one of the high points of cam 105ª will pass the projection 153 of the V-shaped lever to thereby release the printing mechanism and cause a record of weight of the short car on the platform to be printed. The last three wheels of the weighed car will then effect resetting of the printing mechanism, but before this has been accomplished at least two wheels of the car now passing from the platform will have passed over trip 144 and thus rotated cam 105ª through a quarter revolution during which the printing mechanism is inactive. As the last two wheels of the last-named car pass over the trip 144, the cam 105ª will be reset to the full line position of Figs. 48, 49 and 50, the final resetting impulse succeeding the last one or last two resetting impulses imparted to cam 146.

From the foregoing it will be apparent that by the time the second car is alone on the platform 143, all of the cams 105ª, 108ª and 146 will again be in the full line positions of Figs. 48 and 49 so that the foregoing operations may be repeated.

Certain details of construction of the plunger 90 are illustrated in Figs. 18, 19 and 20 which are fully described and claimed in my copending application, Serial No. 681,540 above referred to. Briefly, the spring 155 housed by the plunger 90 permits of its movement relatively to the bell-crank lever 95 by momentum to complete its printing stroke, said spring 155 serving to instantly retract said plunger to prevent interference with travel of tape and typewriter ribbon or a second impact thereof by rebound.

Referring to Figs. 4, 5 and 7, it will be seen that the typewriter ribbon 91 is unwound from a spool 156 rotatably mounted on bracket 94, the free rotation of said spool being resisted by the weight 157 resting thereon, the latter being disposed at the free end of a rocking arm 158. Said ribbon is trained over idle rolls 159, 160 and 161 and connects at its other end with the take-up spool 162 with which the ratchet 163 is associated. A pawl 164 pivotally connected at one end with a rocker arm 165 between the ends of the latter, (which is pivoted on the element 165ª) serves to actuate said ratchet 163 and take-up spool 162. The free end portion of the arm 165 is disposed in the path of a projection 166 at one end of the link or plunger 97 and is moved thereby at each resetting of the plunger 90 to impart motion to said ratchet 163 to thereby cause the ribbon to move a limited distance. An arm 167 on the arm 165 is disposed in the path of the projection 166 for retracting the pawl 163 at each printing stroke of plunger 90.

The ribbon take-up spool 162 and ratchet 163 are rotatably mounted on a shaft 162ª which is flattened at one end 162ᵇ to receive the friction-spring 163ª which bears at its free ends against said ratchet 163 to resist free rotation thereof, said spring being held in place and pressure adjusted by means of the nut 162ᶜ. A flat spring 163ᵇ is mounted by means of screw 163ᶜ on the frame in which said shaft 162ª is mounted and is disposed between said ratchet 163 and a side arm of said frame, said spring co-operating with spring 163ª to effectually resist rotation of said ratchet for obvious reasons.

The ribbon 91 is rewound upon the feed-spool 156 by manually rotating the crank 168 on the shaft of spool 156. To permit this rewinding, the pawl 164 is provided with a projection 169 which extends through a vertical slot in the casing 89 and may be digitally held in raised position to thereby hold the pawl out of engaging relation to the said ratchet during the ribbon-rewinding operation.

As previously stated, the installation may be required to print weight records on cards or tickets instead of a tape and, for economy of cost of construction, it is therefore advisable to so construct the particular part of the machine affected by such selection as to permit ticket printing means to be easily substituted for tape-printing means, or vice versa. Both said means are illustrated in the drawings which also clearly show how one may be substituted for the other.

As tape printing is most commonly practised, most of the drawings already referred to show the use of tape. The tape-feeding means are fully illustrated in Figs. 76 to 83 (Sheets 29 to 31).

The type-wheel 88 when used for tape-printing carries obverse type and when used for ticket-printing has reverse type. In either event said type-wheel is adjusted to cause the zero graduation thereof to register with the apex of the element 171ª, mounted in the recess 173 of the plate 171, when the scale-platform is free of load.

Referring first to Figs. 1 and 2, and more particularly to housing 89, which is there shown as equipped with ticket-printing means, it will be noted that the right-hand end of said housing is quite narrow, and, as shown in Fig. 4, this narrow portion contains the printing plunger 90 which is vertically aligned with the axis of rotation of type-wheel 88 and the rim thereof.

In Fig. 1, I have indicated in dotted lines the tape feed-spool 170 shown in full lines in Fig. 79.

The support for the casing 89 comprises the flat plate 171 on which the support 172 for the spool 170 is mounted. This plate is provided with the recess 173 in which is a boss 174 on which the supporting element for two idle rolls 175 and 176 is mounted. The left hand side portion 177 of said plate or casting 171 is offset downwardly, thereby providing a vertical wall portion 178 at the top of which is a slot 179 through which the tape 92 passes or the ticket is inserted. The casting of which the plate 171, the offset portion 177 and vertical wall portion 178 are parts, rests upon the casting 180 to the left-hand vertical wall 181 of which the housing 182 for the tape-feed motor is secured, as is also a pair of brackets 183. The latter support a platform 184 having an opening 185, the upper face of said platform being flush with the lower wall of the slot 179. Into said opening 185 there is fitted a member consisting of the plate 186 carrying the bracket 187 supporting the idle roll 217; the plate 189, having a slot into which the idle roll 190 projects, the shaft of the latter being mounted in side flanges 191 of said plate 189; and the spacing elements 192 on which said plate 190 is mounted.

It will be noted that the said platform 184 and the motor housing 182 are bodily removable and, by reference to Figs. 2, 73, 74 and 75, that a plate 193 may be substituted therefor, the latter constituting a part of the ticket supporting means.

The motor in the housing 182 includes the shaft 194 carrying the crank 195, the ratchet 196 rigid with the shaft 194. The inner end of a spiral spring 199 is secured to said shaft 194 and its outer end is secured to the annular flange 200 of a disk 201 having a hub 202 rotatable on said shaft 194. To said hub there is secured the inner end of a second spiral or clock-spring 203, the outer end of the latter being secured to the pin 204 on a wall of the housing 182. The disk 202 is a floating element connecting the two springs which thereby act as a single spring of far greater length and width than either thereof and occupying a space of far less diameter than a longer spring would require. The spur gear carries a spring-held pawl 205 engaging the ratchet 196, and meshes with the pinion 206 rigid with spur-gear 207 on shaft 208 which carries the tape take-up spool 209. Spur-gear 207 meshes with spur-pinion 210 on shaft 211 which carries the radial arms 212 on which brake-shoes 213 are slidable, there being light helical springs 214 on said arms which serve to hold said shoes normally approximately at the outer limits of their movement. Said shoes are adapted, under the influence of centrifugal force, to engage the inner cylindrical surface of the casing 215 mounted on the casing 182, said shoes and cylindrical wall functioning as a governor to limit the speed of the shaft 208 to prevent jerk and undue strain on the tape 92.

Mounted on the bracket 187 is a stud shaft 216 on which the idle roll 217 is rotatably mounted, the latter having side flanges 218. One of the latter is provided with a plurality of peripheral recesses, each presenting a radial shoulder 219. One end of a trip-lever 220, pivotally mounted between its ends on a projection 221 on plate 177, normally, engages one of said shoulders 219, its other end portion being Z-shaped and the vertical portion thereof passing through a slot in plate 184. The extreme end of said Z-shaped portion projects into the housing 89 into the path of a vertically reciprocable plunger 222 disposed in the path of the arm of the bell-crank lever 95 which engages in the slot of the printing plunger 90 so that at every printing stroke of the latter said plunger 222 serves to rock the lever 220 against the action of the spring 223 to thereby throw the first-named end of said lever out of engaging relation to the shoulder 219, to thus permit the idle roll 217 to rotate. The association of the bell-crank 95 and plunger 222 is such that the latter is returned to normal position instantly, that is to say, before the lever 95 is reset to the upper limit of its movement.

It is obviously very advantageous to have the motor-spring of such length that it need be wound up like a clock only once for taking up a whole spool of tape 92 without, however, using a spring of extraordinary length and diameter. These advantages accrue from the arrangement shown and described.

The motor being wound up, there is a constant tension on the tape 92 which is secured at one end to spool 209 and trained successively, from spool 170 over the several idle rolls 175, 176, 190, 188 and 217, the latter provided with pins 224 for penetrating the tape to prevent slippage. Following each printing stroke of plunger 90, the roll 217 which controls travel of the tape in an obvious manner, is released from engagement with the trip-lever 220 for rotation through an arc determined by the number and spacings of the shoulders 219.

The tape travels over the plate 184 and is thus exposed for receipt of memoranda or data, such as car numbers and the like, by the scale-master.

If ticket-printing is to be substituted for tape-printing, the motor housing 182, plate 184, carrier for idle rolls 175 and 176, and the spool support 172 are removed.

There is then mounted on the boss 174 a gauge-plate 225 for limiting the inward movement of the ticket inserted through the slot 179. The plate 193 is mounted in p'ace including the angle-plate 226, the inwardly projecting horizontal flange of which opposed the vertical flange of gauge-plate 225 and is provided with a T-shaped recess in its free edge portion into which the lower end of plunger 90 passes to effect printing, the opposed portion of the rim of type-wheel 88 being also aligned with said recess. A plate 227 is secured to the under face of the horizontal flange of plate 226 and extends parallel therewith, the said plate 227 being similarly provided with a T-shaped recess. The ribbon 92 passes between said plates 226 and 227.

There is also secured to the upper edge of the plate 193 opposite the slot 179, a gauge-bar 228 equipped with longitudinal slots for the passage of the fastening screws 229 to permit longitudinal adjustment of said bar to bring the gauge projection 230 thereof to any desired position within the limit of adjustment provided.

The tickets or cards used are of considerable length and, therefore, I further provide a horizontal plate 231 secured along its front edge portion to the plate 193 and which projects into the housing 89 to the left of the narrow portion thereof, the supporting surface for said housing being recessed to receive said plate 231 and the lower edge of said housing being, as clearly shown at 232 (Figs. 46 and 47, Sheet 21), spaced from the upper face of said plate to provide a slot communicating with said slot 179 for insertion of said cards or tickets. A gauge-plate 233 is mounted for adjustment into alignment with said gauge 225 and coaction with the gauge projection 230 for properly positioning the card or ticket to receive the weight-record imprint on a predetermined part of its surface.

In weighing scales of the c'ass to which this invention relates, the load on the scale-platform constitutes a large multiple of the counterbalancing load on the scale-beam, the ratio being, as an ordinary example, 800 lbs. to 1 lb, This necessitates very fine adjustments to limit inaccuracies under the very adverse conditions of use, to less than one per cent. Obviously, the travel of loaded freight cars over the scale-platform and the shocks resulting from the sudden actuations of the recording mechanism and all connecting elements, render these scales unusually subject to disorder and breakages to which ordinary weighing scales are not subject. Hence, this class of scale requires a different class of adjustment in one particular, than other types, and the provision of means for resort to hand-weighing in event of disadjustments of breakages to prevent the total discontinuance of operations pending readjustment or repairs or both.

The principal safeguards against discontinuance of operations comprise the means for transferring the load from the scale-beam 84 to another beam mounted on the same framework above the same, this being omitted from illustration as superfluous. The means for throwing the scale-beam 84 entirely out of service and transferring operations to the said hand-beam, are fully illustrated in Fig. 3, and the novel special adjusting means referred to are shown in Fig. 3 and Figs. 65 to 68 inclusive, sheets 26 and 27.

As shown in Fig. 2, the housings 89 and 54 are carried by the top bar 234 of the framework, the left-hand end portion of the latter not being shown in that figure, but being shown in Fig. 3.

The tension-rod which imposes the weight of the scale-platform load on the scale-beam 84, connects with the lower end of a member 235 equipped with two sets of scale-pivot blocks 236 and 237, respectively, the former resting on the knife-edge pivot bar 238 of the scale-beam 84 and the latter adapted to rest upon the knife-edge pivot bar 239 mounted between the ends of a beam 240 when the latter is raised, as hereinafter described.

The said beam 240 is provided at opposite ends with knife-edge pivot bars 241 and 242, the former engaging in the openings in the arms of the link 243 associated with the tension-rod 244 which is connected, in the usual and well-known manner, with a scale-beam mounted for support on the bar 234 in substantially the same manner that scale-beam 84 is supported on the base 245. That is to say, the rod 244 connects with a member corresponding in function with the member 235.

The bar 242 engages in openings in the arms of the inverted U-shaped block 246 having a threaded opening in its middle or web-portion for engagement with the screw-shaft 247 equipped with crank 248 and rotatably mounted in the bearing element 249 on the bar 234.

It will be obvious that when the beam 240 is in the position shown in Fig. 3, the hand-beam above bar 234, which is fully adjusted, will be entirely free of load so that the end portion thereof corresponding to that of beam 84 to the right of the pivot bar 250, will be depending.

By turning crank 248 in the direction to raise the contiguous end of beam 240, the pivot bar 239 will be brought into supporting relation to the blocks 237 and, as this occurs, the bar 238 will be relieved of load, the latter being now shifted to tension rod 244 without disturbing the normal position of the member 235, for the reason that as the load is taken off the scale-beam 84 it is transferred to the upper hand-beam and causes the latter to run on its pivot (corresponding to pivot 250) until it indicates balance with zero load on the platform. As soon as beam 84 indicates relief from load by lowering of its right-hand end portion, said portion is manually raised and permanently supported in the usual manner while the operation of crank 248 is continued until the upper beam indicates balance as aforesaid.

Hand-weighing may then be done until the beam 84 is readjusted or repairs effected, thereupon the last-mentioned operations are reversed to again render beam 84 operative. It will be understood, of course, that adjustment of the scale-beam 84 will necessitate imposition of the load thereon so that the last-mentioned operations may be required to be several times repeated in the course of effecting adjustments during intervals between weighing operations.

The extremely delicate adjustments of the beam 84 required under the conditions of use, as aforesaid, could not, it was found, be efficiently effected by the means and methods ordinarily employed and which are present in this case. The problem was solved by the means shown in detail in Figs. 65 to 68, wherein the knife-edge pivot bar 238 is shown to be mounted in a block 251 movable longitudinally of the beam 84 in a slot 252 in the latter. In its opposite ends (vertical faces) said block 251 is provided with recesses midway between the front and rear faces thereof, the inner or bottom surfaces being slightly tapered so that said recesses are of least depth at their upper ends. Opposed to said recesses in the said block 251 are recesses in the end walls of the slot 252, said recesses being substantially semi-cylindrical and having axes parallel with the end walls of the block 251. Wedges 253 having cylindrical faces to fit the said recesses in the end walls of the slot 252 and tapered portions snugly fitting the recesses in the block 251 are mounted in said respective pairs of opposed recesses, for preventing relative movement between the said block 251 and said beam 84. Each of said wedges terminates at its lower or smaller end in a threaded shank 254 which passes through openings 255 communicating with the slot 252, said wedges being inserted into position, as described, through the openings 256 in the upper portion of the beam 84. Nuts 257 on said shanks 254 are adjusted to bear upon the lower face of the beam 84.

By loosening both said nuts 257, and forcing one wedge up to permit lowering of the other, the block 251 may be adjusted to vary the spacing of the bar 238 from the bar 250 in either direction as minutely as may be required.

I claim as my invention:—

1. In a weighing scale of the type specified, the combination with a weighing mechanism including a scale platform of a pair of track-levers adapted for actuation by car-wheels spaced from each other, one thereof disposed at the discharge end of the scale-platform and the other thereof at the receiving end thereof for actuation by a car before entry of same upon the platform, weight recording mechanism associated with said weighing mechanism and further associated with both said track-levers for actuation and control thereby, said recording mechanism including a printing plunger, means for effecting a printing stroke thereof, means for effecting resetting thereof following a printing stroke, operative connections between said several means and between said track-levers to effect resetting thereof by one only of said levers and effect control of the printing stroke to record or prevent recording of weight by either of said track-levers in accordance with the spacing of succeeding cars from each other.

2. In a weighing scale of the type specified, the combination with a weighing mechanism including a scale platform, of a pair of track-levers adapted for actuation by car-wheels spaced from each other, one thereof disposed at the discharge end of the scale-platform and the other thereof at the receiving end thereof for actuation by a car before entry of same upon the platform, weight recording mechanism associated with said weighing mechanism and further associated with both said track-levers for actuation and control thereby, said recording mechanism including a printing plunger, means for effecting a printing stroke thereof, means for effecting resetting thereof following a printing stroke, operative connections between said several means and between said track levers to effect resetting thereof by one only of said levers and effect control of the printing stroke to record or prevent recording of weight by either of said track-levers in accordance with the spacing of succeeding cars from each other, said operative connections including means whereby the control of the printing stroke is non-interferent with the resetting operation.

3. In a scale of the type defined, in combination, a weighing mechanism including a scale platform, a recording mechanism including a spring held printing plunger, a trip-lever associated therewith, a latching element associated with said trip-lever for holding it in position against the action of its spring in readiness for a printing impetus, a pair of controlling mechanisms associated with said trip-lever, and latching element for controlling the tripping of said plunger independently of each other, a track-lever for each of said controlling mechanisms spaced from each other for actuation by cars for determining the minimum spacing of successive cars from each other, on the scale platform, and means associated with one of said controlling mechanisms for resetting said plunger, trip-lever and latching element.

4. In a scale of the type defined, in combination a weighing mechanism including a scale platform, a recording mechanism associated with the weighing mechanism and including a spring-actuated printing plunger, a setting means therefor including latching means for retaining said plunger in set position, two relatively spaced track-levers adapted to be actuated by cars travelling over said scale platform and spaced from each other, a recorder mechanism, operating mechanism associated with each track-lever for actuation thereby, one of said operating mechanisms including said setting means for actuating the same, and means common to both said operating mechanisms for controlling the tripping of said plunger by one or other of two successive cars according to the relative spacing thereof with respect to the spacing of said track-levers.

5. In a scale of the type defined, in combination a weighing mechanism including a scale platform, a recording mechanism associated with the weighing mechanism and including a spring-actuated printing plunger, a setting means therefor including latching means for retaining said plunger in set position, two relatively spaced track-levers adapted to be actuated by cars travelling over said scale platform and spaced from each other, a recorder mechanism, operating mechanism associated with each track-lever for actuation thereby, one of said operative mechanisms including said setting means and means for effecting tripping of said plunger, and means associated with the other of said operating mechanisms for controlling the tripping of said plunger to thereby cause that one of two successive cars, one of which is disposed between and the other of which is approaching said track-levers, which first strikes one of said track-levers, to control the printing stroke of said plunger.

6. In a scale of the type defined, a weighing mechanism including a scale platform arranged in the path of the cars to be weighed, a weight recording mechanism associated with said weighing mechanism and including a spring-actuated printing-plunger, two track-levers spaced from each other, a pair of plunger governing devices associated with said track-levers for actuation thereby, one of said devices including means for setting said plunger against the action of its spring and for effecting tripping thereof, and the other of said devices including means for controlling the tripping of said plunger to thereby effect preventive control of recording the weight of a car disposed between said track-levers by the succeeding car approaching said track-levers in the event said cars are spaced apart a less distance than said track-levers.

7. In a scale of the type defined, a weighing mechanism including a scale platform arranged in the path of the cars to be weighed, a weight recording mechanism associated with said weighing mechanism and including a spring-actuated printing-plunger, two track-levers spaced from each other, a pair of plunger governing devices associated with said track-levers for actuation thereby, one of said devices including means for setting said plunger against the action of its spring and for effecting tripping thereof, and the other of said devices including means for controlling the tripping of said plunger to thereby effect preventive control of recording the weight of a car disposed between said track-levers by the succeeding car approaching said track-levers in the event said cars are spaced apart a less distance than said track-levers, said devices having means to provide for resetting to normal positions after the passage of each car regardless of the sequence of operations of said track-levers.

8. In a scale of the kind specified, a weighing mechanism including a scale platform for the passage of the cars to be weighed, two track-levers arranged fore and aft with respect to said platform and spaced from each other for successive operation by car wheels, each thereof adapted to be actuated a predetermined number of times per passing car, a governor mechanism associated with each of said respective track-levers for actuation thereby and each including a pawl and ratchet for rotating the latter through a predetermined arc per passing car, a weight recording apparatus associated with said weighing mechanism and including a printing plunger associated with one of said governor mechanisms for actuation thereby in one direction, a spring for actuating said plunger in the opposite direction, and means associated with each of said governor mechanisms controlling the actuation of said plunger by its spring independently of the other governor mechanism when said plunger actuating governor mechanism is disposed out of engaging relation to said plunger.

9. In a scale of the type specified, a weighing mechanism including a scale platform for the passage of the cars to be weighed, a pair of spring-held track-levers disposed for actuation by car wheels a predetermined number of times per passing car and spaced from each other, rocking cams operatively associated with said respective track-levers for rotation through a predetermined arc at each actuation of the lever associated therewith, a reciprocable plunger operatively associated with each of said respective cams for actuation thereby at each rocking movement thereof, weight recording apparatus associated with said weighing mechanism and further associated with said plungers for actuation and control thereby, and manually operable means for completely associating said recording apparatus from said track-levers to thereby obviate recording of weights of empty cars or permit the use of the scale for handweighing of cars.

10. In a scale of the type specified, a weighing mechanism including a scale platform for the passage of the cars to be weighed, a pair of spring-held track-levers disposed for actuation by car wheels a predetermined number of times per passing car and spaced from each other, rocking cams operatively associated with said respective track-levers for rotation through a predetermined arc at each actuation of the lever associated therewith, a reciprocable plunger operatively associated with each of said respective cams for actuation thereby at each rocking movement thereof, recording apparatus associated with said weighing mechanism and further associated with said plungers for actuation and control thereby, a slidable carriage supporting said cams in operative relation to said plungers and manually operable means for actuating said carriage for throwing said cams into or out of operative relation to said plungers at will to thereby render said recording mechanism operative or inoperative at will.

11. In a scale of the type specified, a weighing means including a scale platform for the passage of the cars to be weighed, a weight recording device associated with said means and including a spring-actuated printing plunger, mechanism for setting the same against the action of its spring, a track-lever operatively associated with said mechanism for releasing said plunger for actuation by its spring as the first wheel of a car strikes said track-lever, a second track-lever spaced from the first in advance thereof, mechanism associated with said second track-lever for actuation thereby, and means actuated by said last-named mechanism for preventing actuation of said plunger by its spring when actuated by the front wheel of a second car prior to actuation of said first named mechanism by a car in advance of said second car to thereby prevent recording of the weight of the last-mentioned car.

12. In a scale of the type specified, weighing means including a scale platform for the passage of the cars to be weighed, a weight recording device associated with said means and including a spring-actuated printing plunger, mechanism for setting the same against the action of its spring, a track-lever operatively associated with said mechanism for releasing said plunger for actuation by its spring as the first wheel of a car strikes said track-lever, a second track-lever spaced from the first in advance thereof, mechanism associated with said second track-lever for actuation thereby, and means actuated by said last-named mechanism for preventing actuation of said plunger by its spring when actuated by the front wheel of a second car prior to actuation of said first-named mechanism by a car in advance of said second car to thereby prevent recording of the weight of the last-mentioned car, means to provide for both of said mechanisms being reset by passage of both cars over the respective track-levers to thereby permit recording of the weight of said second car.

13. In a scale of the type specified, a weighing means including a scale platform for the passage of the cars to be weighed, weight recording mechanism associated with the scale-platform, a track-lever operatively associated with said scale-platform and said mechanism for effecting actuation of the latter to record the weight of the car on the platform as the latter attains a predetermined position on said platform, a lockout mechanism operatively associated with said recording mechanism for preventing recording of weight thereby, a track-lever operatively associated with said lockout mechanism and with the platform for actuation by a car approaching the scale-platform to prevent recording of weight of the car on the platform in event that the approaching car strikes the last-named track-lever prior to actuation of the platform lever by the car on the platform, said second track-lever and the lockout mechanism associated therewith so associated with said recording mechanism so as to prevent interference with the operation of the latter except when two successive cars are spaced apart a distance less than that separating said track-levers.

14. In a scale of the type specified, a weighing means including a scale platform for the passage of the cars to be weighed, weight recording mechanism associated with the scale-platform, a track-lever operatively associated with said scale-platform and said mechanism for effecting actuation of the latter to record the weight of the car on the platform as the latter attains a predetermined position on said platform, a lockout mechanism operatively associated with said recording mechanism for preventing recording of weight thereby, a track-lever operatively associated with said lockout mechanism and with the platform for actuation by a car approaching the scale-platform to prevent recording of weight of the car on the platform in event that the approaching car strikes the last-named track-lever prior to actuation of the platform lever by the car on the platform, and manually operable means for dissociating and associating said track-levers with said mechanisms at will to control the recording of weights of cars spaced from each other distances more than a car length less than the distance separating said track-levers.

15. In a scale of the type specified, a weighing means including a scale platform, a track-lever disposed on the scale-platform for actuation by a car about to leave said platform, a weight recording mechanism operatively associated with said track-lever for actuation thereby to record the weight of said car and reset said mechanism in readiness to record the weight of the next succeeding car, a track-lever disposed for actuation by a car about to enter upon the scale-platform, lockout mechanism operatively associated with said track-lever for actuation thereby to render the recording mechanism inoperative to effect a recording of weight upon actuation of the last-named track-lever prior to the first mentioned, said recording mechanism including a reciprocable element, a dog thereon, a pivoted stop element adapted to be thrown into and out of engaging relation to said dog, and a cam included in said lockout mechanism for actuating said pivoted stop element to throw the same into the path of said dog.

16. In a scale of the type specified, a weighing means including a scale platform, a track-lever disposed on the scale-platform for actuation by a car about to leave said platform, a weight recording mechanism operatively associated with said track-lever for actuation thereby to record the weight of said car and reset said mechanism in readiness to record the weight of the next succeeding car, a track-lever disposed for actuation by a car about to enter upon the scale-platform, lockout mechanism operatively associated with said track-lever for actuation thereby to render the recording mechanism inoperative to effect recording of weight upon actuation of the last-named track-lever prior to the first-mentioned, said recording mechanism including a reciprocable element, a dog thereon, a pivoted stop element adapted to be thrown into and out of engaging relation to said dog, and a cam included in said lockout mechanism for actuating said pivoted stop element to throw the same into the path of said dog, and means for retaining said stop element and dog engaged with each other after actuation of the former by said cam and effecting release thereof upon completion of resetting of said recording mechanism.

17. In a scale of the kind specified, the combination with a scale platform, a weight recording mechanism and a track-lever for actuating the same, of means operatively associating the track-lever with said recording mechanism including a reciprocable carriage, a rock-shaft rotatably mounted therein and operatively connected with said track-lever to be rocked thereby, means for supporting said carriage at the upper limit of its movement, said means including a manually operable rock-shaft and a crank therefor, and a cam on said first-named rock-shaft disposed in operative relation to the recording mechanism when said carriage is disposed at the upper limit of its movement and vice versa when said carriage is disposed at the lower limit of its movement.

18. In a scale of the kind specified, the combination with a scale platform, a weight recording mechanism, a track-lever for actuating the same and a spring and cable associated with said track-lever to hold same at one limit of its movement for actuation by car-wheels, said cable including a sprocket-chain, of a reciprocable carriage, a rock-shaft rotatably mounted therein and carrying a cam and a sprocket, said sprocket-chain trained over the latter, said spring supporting track-lever exerting a force on said carriage tending to hold the latter at one limit of its movement, means including a manually operable rock-shaft for moving said carriage against the action of said spring and retaining the same in said position, said cam being operatively associated with and dissociated from said recording mechanism as said carriage is moved toward and from the last-named position, respectively.

19. In a weighing scale of the type specified, a weighing means including a scale platform for the passage of the cars to be weighed, a weight recording mechanism associated with said means, a track-lever comprising a bracket mounted on the rail and equipped at its outer end with a bearing disposed axially parallel with said rail, said lever associated with said mechanism and platform, a member pivotally associated with said bracket, and a shoe having depressed end-portions mounted on said member, the said shoe for actuation by each wheel of a car passing over the same or by a plurality of said wheels.

20. In a weighing scale of the type specified, a weighing means including a scale platform for the passage of the cars to be weighed, a weight recording mechanism associated with said means, a track-lever pivotally associated with a rail for actuation by the flanges of car wheels, said lever associated with said mechanism and platform, and means associated with said rail and said lever for adjusting the level of the top surface of the latter relatively to the rail tread.

21. In a scale of the kind specified, a weighing means, a track-lever, a weight recording mechanism connected therewith and adapted to be actuated thereby, the connection between said track-lever and said recording mechanism including cables, sheaves over which said cable is trained, base elements associated with said sheaves, and sheave-blocks pivotally associated with said base elements for adjustment relatively thereto to effect alignment of successive sheaves with each other.

22. In a scale of the kind specified, a weighing means, a track-lever, a weight recording mechanism connected therewith and adapted to be actuated thereby, the connection between said track-lever and said recording mechanism including cables, sheaves over which said cable is trained, base elements associated with said sheaves, and sheave-blocks pivotally associated with said base elements universally for adjustment in both a vertical and a horizontal plane relatively thereto for effecting alignment of successive sheaves.

GEORGE G. WILEY.